US010868604B2

(12) United States Patent
Onggosanusi et al.

(10) Patent No.: US 10,868,604 B2
(45) Date of Patent: Dec. 15, 2020

(54) METHOD AND APPARATUS FOR REFERENCE SIGNAL FOR MEASUREMENTS

(71) Applicant: Samsung Electronics Co., Ltd., Suwon-si (KR)

(72) Inventors: Eko Onggosanusi, Coppell, TX (US); Md Saifur Rahman, Plano, TX (US); Li Guo, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/364,030

(22) Filed: Mar. 25, 2019

(65) Prior Publication Data

US 2019/0305837 A1    Oct. 3, 2019

Related U.S. Application Data

(60) Provisional application No. 62/801,438, filed on Feb. 5, 2019, provisional application No. 62/692,902, filed on
(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04L 1/0026* (2013.01); *H04L 5/0048* (2013.01);
(Continued)

(58) Field of Classification Search
CPC .... H04B 7/0626; H04B 7/0639; H04L 1/0026
See application file for complete search history.

(56) References Cited

U.S. PATENT DOCUMENTS 10,098,020 B2* 10/2018 Davydov .............. H04W 24/02

FOREIGN PATENT DOCUMENTS

WO    2017026863 A1    2/2017
WO    2018006311 A1    1/2018

OTHER PUBLICATIONS

ISA/KR International Search Report and Written Opinion of the International Searching Authority, International Application No. PCT/KR2019/003701, Jul. 10, 2019, 9 pages.
(Continued)

*Primary Examiner* — Chandrahas B Patel

(57) ABSTRACT

Methods and apparatuses for a reference signal for measurements. A method for operating a user equipment (UE), includes receiving, from a base station, a channel state information-reference signal (CSI-RS) trigger and an aperiodic CSI (A-CSI) request and decoding the CSI-RS trigger and the A-CSI request. The method includes measuring a CSI-RS associated with the CSI-RS trigger; and calculating, based on the measured CSI-RS, an A-CSI report associated with the A-CSI request. The method includes transmitting, to the base station, the A-CSI report. The CSI-RS includes two signal components for channel and interference measurement, respectively. Additional embodiments include base station and UE apparatuses and a method for operating a base station.

17 Claims, 14 Drawing Sheets

Related U.S. Application Data on Jul. 2, 2018, provisional application No. 62/681,258, filed on Jun. 6, 2018, provisional application No. 62/650,066, filed on Mar. 29, 2018.

(51) Int. Cl.
  *H04W 88/08* (2009.01)
  *H04W 24/10* (2009.01)
  *H04W 88/02* (2009.01)
  *H04L 1/00* (2006.01)

(52) U.S. Cl.
  CPC .......... *H04W 24/10* (2013.01); *H04W 88/02* (2013.01); *H04W 88/08* (2013.01)

(56) References Cited

OTHER PUBLICATIONS

Ericsson, "CSI Framework," R1-1716347, 3GPP TSG-RAN WG1 NR Ad Hoc #3, Nagoya, Japan, Sep. 18-21, 2017, 10 pages.
Huawei, et al., "Remaining issues for CSI framework," R1-1719426, 3GPP TSG RAN WG1 Meeting #91, Reno, USA, Nov. 27-Dec. 1, 2017, 8 pages.
Samsung, "Issues on the trigger state definition," R1-1801958, 3GPP TSG RAN WG1 Meeting #92, Athens, Greece, Feb. 26-Mar. 2, 2018, 5 pages.
3rd Generation Partnership Project; Technical Specification Group Radio Access Network; Evolved Universal Terrestrial Radio Access (E-UTRA); Physical channels and modulation (Release 14), 3GPP TS 36.211 V14.0.0, Sep. 2016, 170 pages.
3rd Generation Partnership Project; Technical Specification Group Radio Access Network; Evolved Universal Terrestrial Radio Access (E-UTRA); Multiplexing and channel coding (Release 14), 3GPP TS 36.212 V14.0.0, Sep. 2016, 148 pages.
3rd Generation Partnership Project; Technical Specification Group Radio Access Network; Evolved Universal Terrestrial Radio Access (E-UTRA); Physical layer procedures (Release 14), 3GPP TS 36.213 V14.0.0, Sep. 2016, 406 pages.
3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.0.0, Sep. 2016, 96 pages.
3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.0.0, Sep. 2016, 644 pages.
3rd Generation Partnership Project; Technical Specification Group Radio Access Network; NR; Physical channels and modulation (Release 15), 3GPP TS 38.211 V15.0.0, Dec. 2017, 73 pages.
3rd Generation Partnership Project; Technical Specification Group Radio Access Network; NR; Multiplexing and channel coding (Release 15), 3GPP TS 38.212 V15.0.0, Dec. 2017, 82 pages.
3rd Generation Partnership Project; Technical Specification Group Radio Access Network; NR; Physical layer procedures (Release 15), 3GPP TS 38.213 V15.0.0, Dec. 2017, 56 pages.
3rd Generation Partnership Project; Technical Specification Group Radio Access Network; NR; Physical layer procedures for data (Release 15), 3GPP TS 38.214 V15.0.0, Dec. 2017, 71 pages.
3rd Generation Partnership Project; Technical Specification Group Radio Access Network; NR; Medium Access Control (MAC) protocol specification (Release 15), 3GPP TS 38.321 V15.0.0, Dec. 2017, 55 pages.
3rd Generation Partnership Project; Technical Specification Group Radio Access Network; NR; Radio Resource Control (RRC) protocol specification (Release 15), 3GPP TS 38.331 V15.0.0, Dec. 2017, 188 pages.

\* cited by examiner

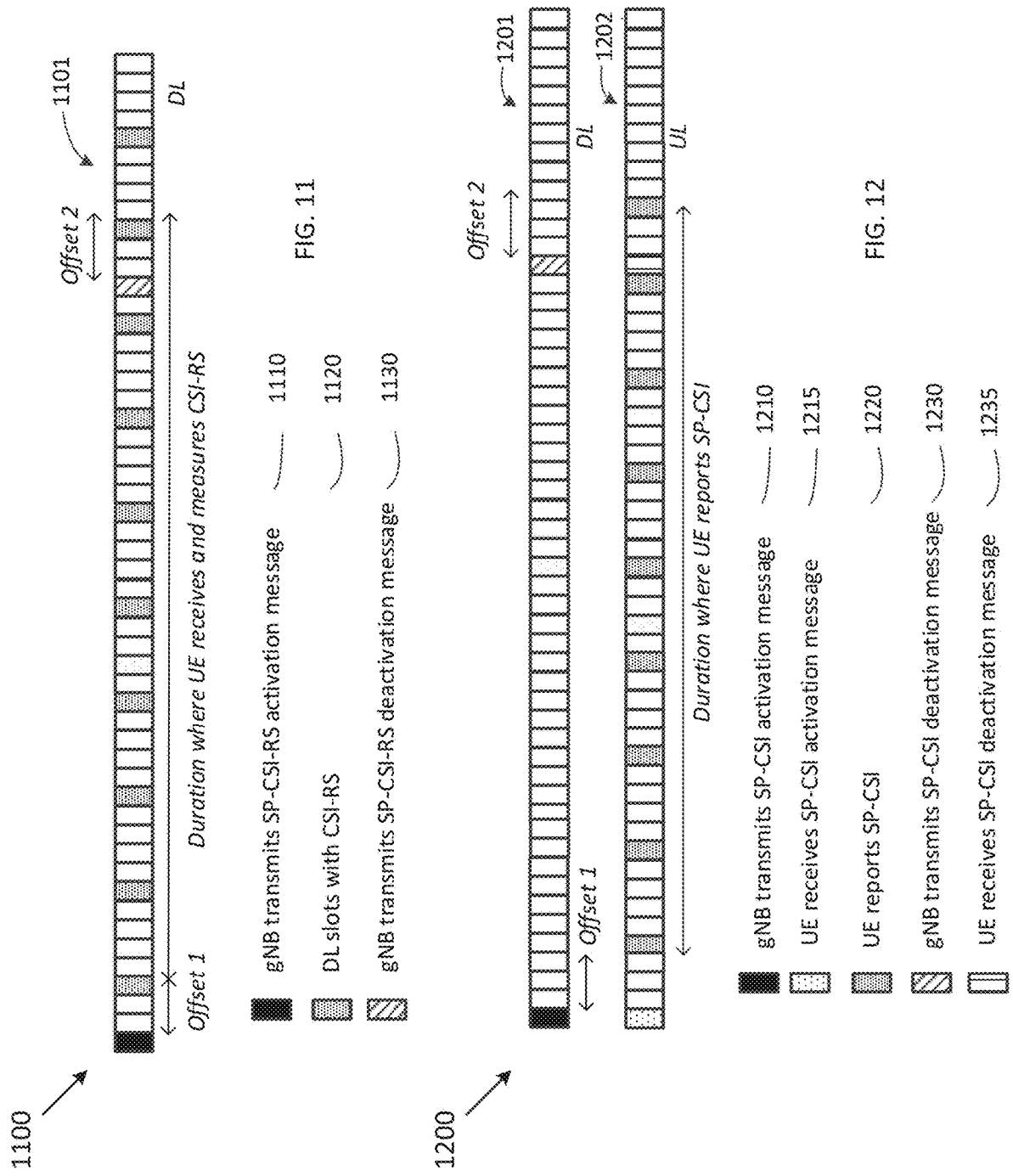

METHOD AND APPARATUS FOR REFERENCE SIGNAL FOR MEASUREMENTS

PRIORITY

This application claims priority to U.S. Provisional Patent Application No. 62/650,066 filed Mar. 29, 2018; U.S. Provisional Patent Application No. 62/681,258 filed Jun. 6, 2018; U.S. Provisional Patent Application No. 62/692,902 filed Jul. 2, 2018; and U.S. Provisional Patent Application No. 62/801,438 filed Feb. 5, 2019. The above-identified provisional patent applications are hereby incorporated by reference in their entirety.

TECHNICAL FIELD

The present disclosure relates generally to methods for wireless communication systems and, more specifically, transmitting and receiving measurement reference signals (RS) along with MIMO transmission.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CQI reporting.

In one embodiment, a UE is provided. The UE includes a transceiver and a processor operably connected to the transceiver. The transceiver is configured to receive, from a base station, a channel state information-reference signal (CSI-RS) trigger and an aperiodic CSI (A-CSI) request. The processor is configured to decode the CSI-RS trigger and the A-CSI request; measure a CSI-RS associated with the CSI-RS trigger; and calculate, based on the measured CSI-RS, an A-CSI report associated with the A-CSI request. The transceiver is further configured to transmit, to the base station, the A-CSI report. The CSI-RS includes two signal components for channel and interference measurement, respectively.

In another embodiment, a base station (BS) is provided. The BS includes a processor and a transceiver operably connected to the processor. The processor is configured to generate a CSI-RS trigger and an A-CSI request. The transceiver is configured to transmit, to a UE, the CSI-RS trigger and the A-CSI request and receive, from the UE, an A-CSI report associated with the A-CSI request calculated based on measurement of a CSI-RS associated with the CSI-RS trigger. The CSI-RS includes two signal components for channel and interference measurement, respectively.

In yet another embodiment, a method for operating a UE is provided. The method includes receiving from a base station, a CSI-RS trigger and an A-CSI request and decoding the CSI-RS trigger and the A-CSI request. The method includes measuring a CSI-RS associated with the CSI-RS trigger; and calculating, based on the measured CSI-RS, an A-CSI report associated with the A-CSI request. The method includes transmitting, to the base station, the A-CSI report. The CSI-RS includes two signal components for channel and interference measurement, respectively.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example embodiment of semi-persistent CSI-RS activation and deactivation according to an embodiment of the present disclosure;

FIG. 12 illustrates an example embodiment of semi-persistent CSI activation and deactivation according to an embodiment of the present disclosure;

DETAILED DESCRIPTION

Figure 1:
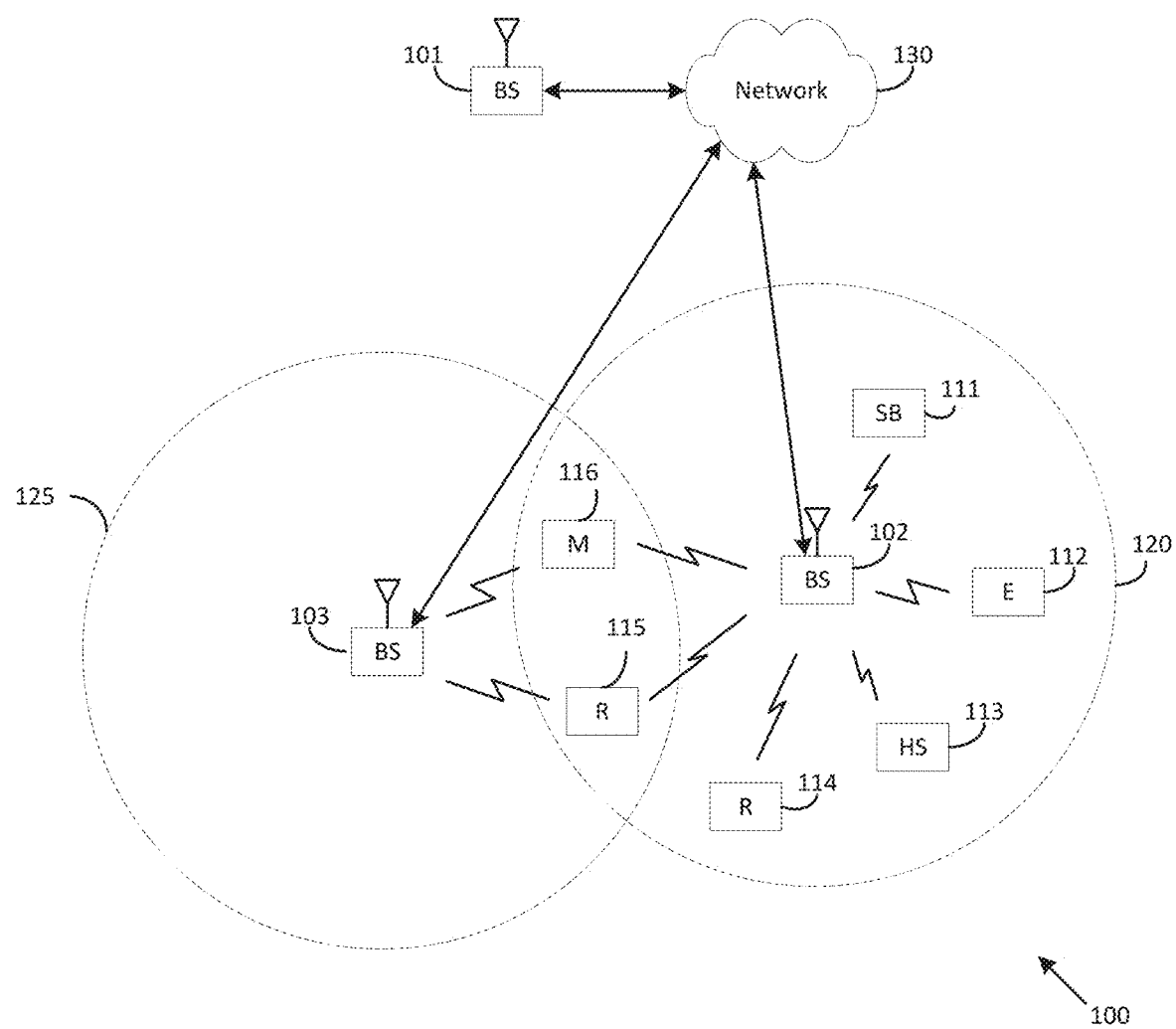
FIG. 1 illustrates an example wireless network according to various embodiments of the present disclosure.

FIGS. 1 through 15, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands or, in general, above 6 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive Channel State Information Reference Signal (CSI-RS) and transmit Sounding Reference Signal (SRS).

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
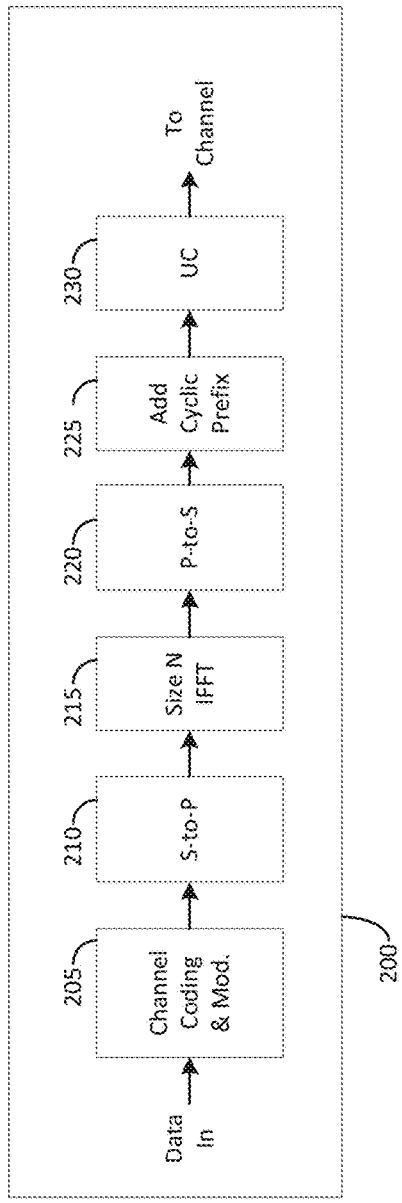
FIGS. 2A and 2B illustrate example wireless transmit and receive paths according to various embodiments of the present disclosure.
Figure 2B:
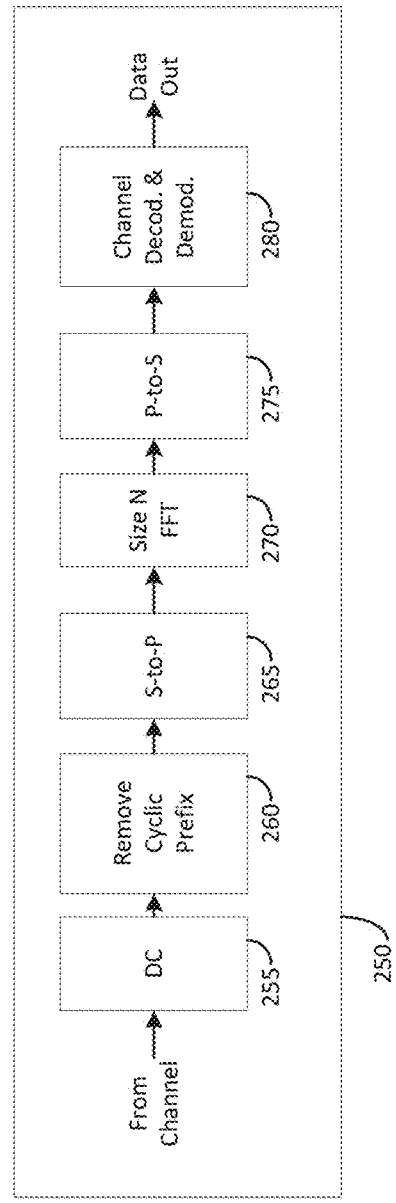

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive CSI-RS and transmit SRS as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
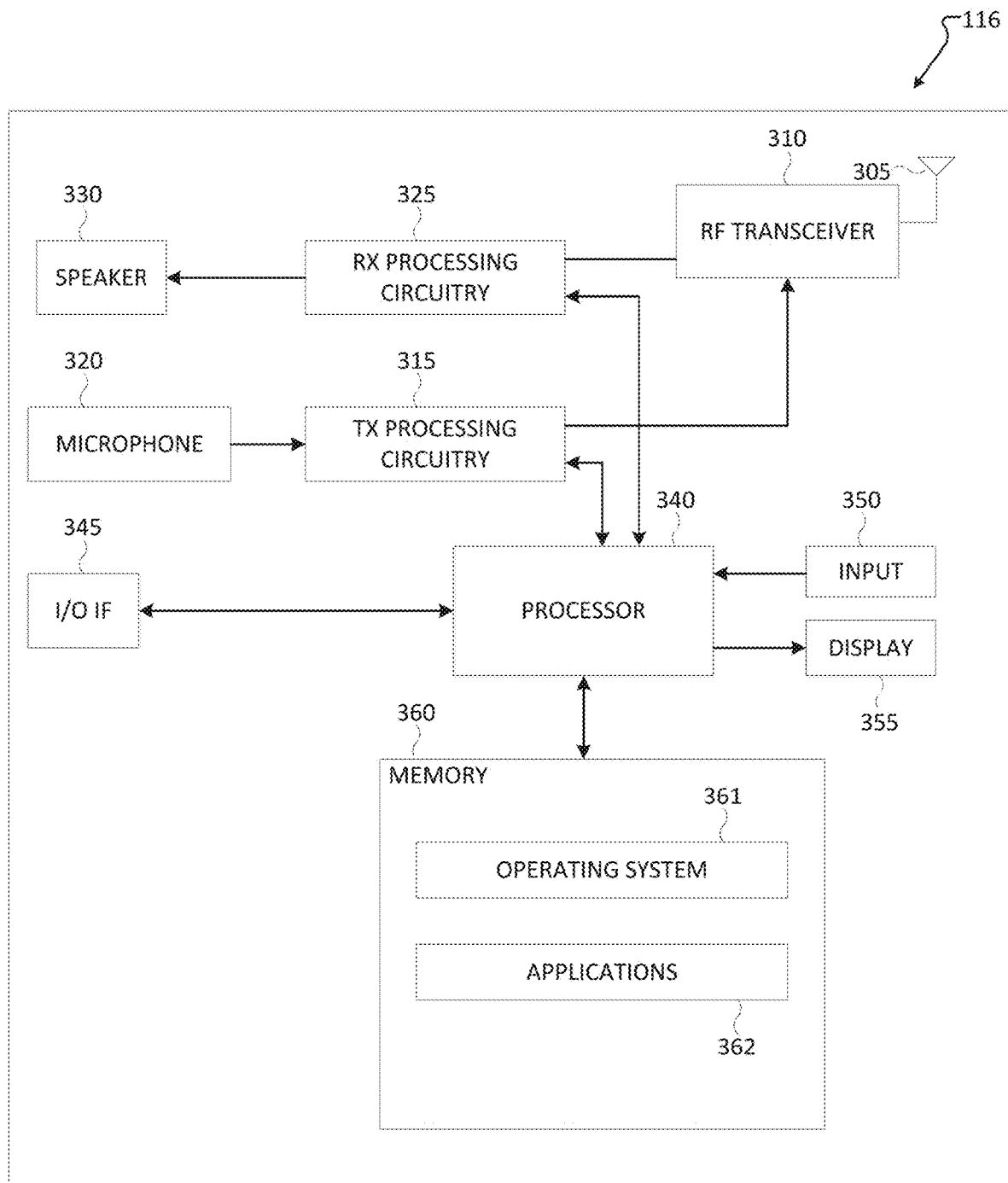
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for CSI-RS reception and measurement for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random access memory (RAM), Flash memory, or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
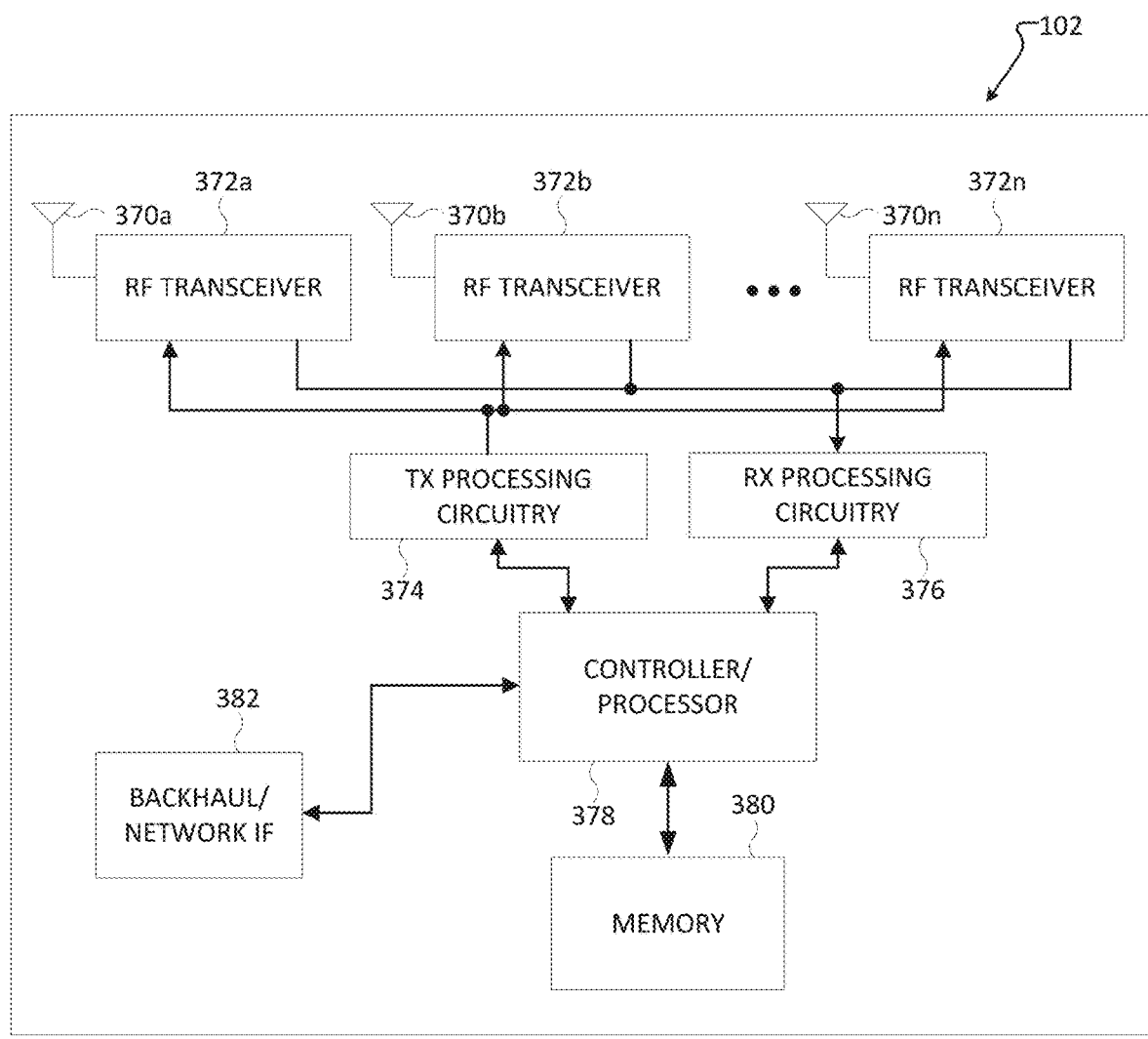
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) allocate and transmit CSI-RS as well as allocate and receive SRS.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
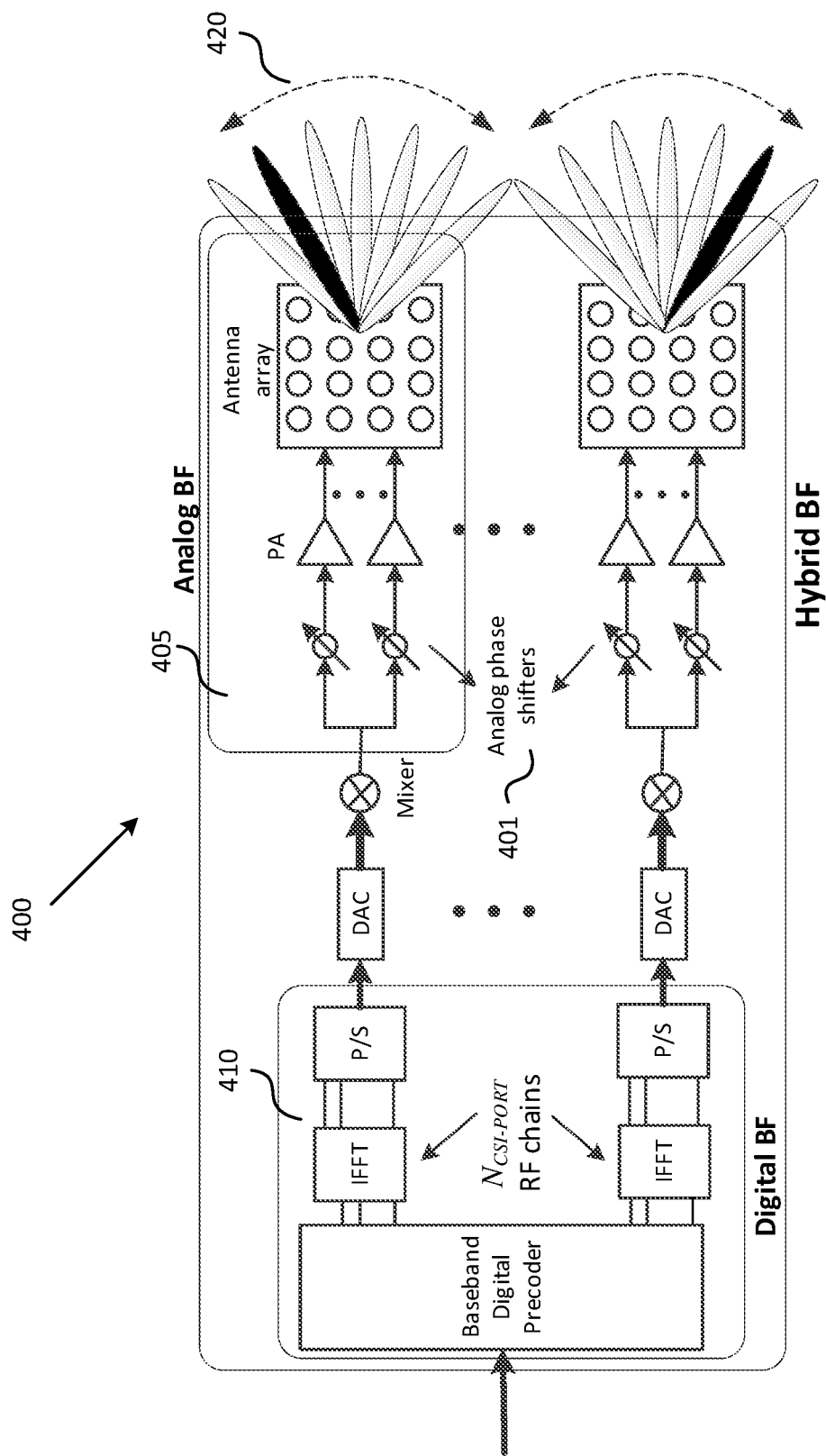
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in embodiment 400 of FIG. 4. In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported in Rel.13/14 LTE: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. In this embodiment, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). In this embodiment, (at least at a given time/frequency) CSI-RS ports have narrow beam widths and hence not cell wide coverage, and (at least from the eNB perspective) at least some CSI-RS port-resource combinations have different beam directions. In 5G NR, such differentiation is not supported although the CSI acquisition framework is designed to accommodate such use cases.

In 3GPP LTE and NR (new radio access or interface), network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

Figure 5:
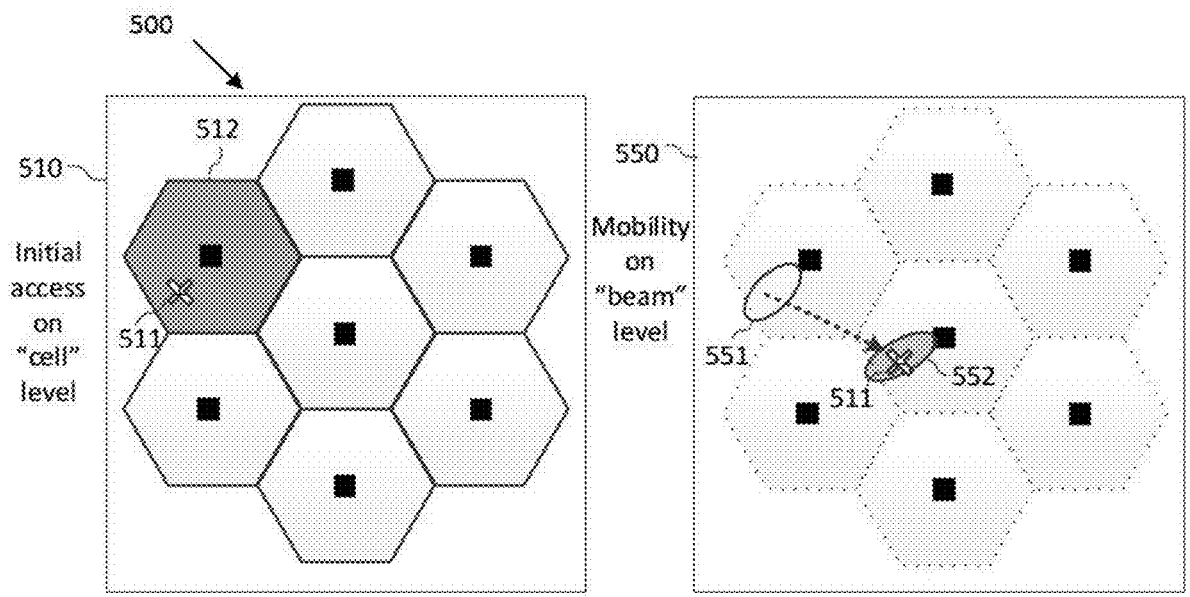
FIG. 5 illustrates an example embodiment of a UE-centric access with two levels of radio resource entity according to an embodiment of the present disclosure.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework can be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework can be applicable whether beam sweeping (as illustrated in FIG. 5) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 5), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e. inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In the large "super-cell," high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Relaxing the cell boundaries to create the large "super-cell" can also achieve significant reduction of higher-layer procedures for connected UEs. While the large "super-cell" presents an opportunity to increase system capacity (measured in terms of the number of sustainable UEs), efficient measurement of channel and interference becomes a challenge if applied in the current system.

Therefore, there is a need for measurement reference signal (RS) to enable both channel and interference measurements efficiently.

Efficient CSI-RS design (be it for CSI or multi-beam measurement/reporting) requires at least the following. First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework can be applicable for or agnostic to whether one beam is formed for one CSI-RS port (for instance, where multiple analog ports are connected to one digital port, and a plurality of widely separated digital ports are utilized) or one beam is formed by multiple of CSI-RS ports. In addition, the framework can be applicable whether beam sweeping (as illustrated in FIG. 4) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 4), repetition, diversity, and/or multi-TRP transmission.

To efficiently utilize and share CSI-RS resources among UEs (especially in highly loaded cells/networks), the network can configure a time-domain behavior that determines the manner in which CSI-RS is measured, be it periodic (characterized by periodicity and time offset), semi-persistent (characterized by periodicity and time offset, yet requiring activation and deactivation), and aperiodic (characterized by one-shot DCI-triggered measurement). While it is possible for a gNB to transmit CSI-RS in every slot/subframe, a UE is configured to measure the CSI-RS only in slot(s)/subframe(s) associated with the configured time-domain behavior. Therefore, the transmitted CSI-RS can be shared by a number of UEs.

Semi-persistent (SP) CSI-RS shares some characteristics with periodic (P) as well as aperiodic (AP) CSI-RS. For instance, SP-CSI-RS requires periodicity and slot/subframe offset just as P-CSI-RS, yet is dynamically triggered just as AP-CSI-RS. Furthermore, SP-CSI-RS can also be perceived as "multi-shot" AP-CSI-RS where a UE measures more than one instances of CSI-RS (in a periodic manner) within a given time-interval. In NR, SP-CSI-RS is dynamic triggered (activated and deactivated) using medium access control (MAC, L2) control element (CE). While the activation/deactivation using MAC CE can be more reliable than a mechanism based on L1 control signaling, the MAC-layer latency is significantly higher. In some embodiments, DCI-based activation/deactivation similar to that used for LTE semi-persistent scheduling (SPS) can be used.

For SP-CSI-RS, the same mechanism is used for activating and deactivating UE measurement in NR. While this can be perceived as a natural approach, the latency requirement for activation and deactivation can differ for various reasons.

Therefore, there is also a need for semi-persistent CSI-RS reception mechanism to enable both channel and interference measurements efficiently.

In the following, for brevity, both FDD and TDD are considered as the duplex method for both DL and UL signaling.

Although various descriptions and embodiments to follow assume orthogonal frequency division multiplexing (OFDM) or orthogonal frequency division multiple access (OFDMA), aspects of the present disclosure can be extended to other OFDM-based transmission waveforms or multiple access schemes such as filtered OFDM (F-OFDM).

The present disclosure includes the following components which can be used in conjunction or in combination with one another, or can operate as standalone schemes. A first component pertains to DL MIMO transmission and reception. A second component pertains to beam-specific DL measurement RS. A third component pertains to control signaling. A fourth component pertains to semi-persistent (SP) activation/deactivation. A fifth component pertains to activation and deactivation of SP-CSI-RS and SP-CSI.

Each of these components can be used either alone (without the other component) or in conjunction with at least one of the other components. Likewise, each of these components includes a plurality of sub-components. Each of the sub-components can be used either alone (without any other sub-component) or in conjunction with at least one of the other sub-components. For instance, any example embodiment of the fourth component (condition of usage of a UCI multiplexing scheme) can be combined with any example embodiment of the fifth component (UCI multiplexing scheme).

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot, wherein one subframe or slot can comprise a transmission time interval.

For the first component (that is, DL MIMO transmission and reception), in one embodiment, a UE-centric access which utilizes two levels of radio resource entity is described in embodiment 500 of FIG. 5. These two levels can be termed as "cell" and "beam". These two terms are used for illustrative purposes thereby serving as examples. Other terms such as radio resource (RR) 1 and 2 can also be used. Additionally, the term "beam" as a radio resource unit is to be differentiated with, for instance, an analog beam used for beam sweeping in FIG. 4. In place of "beam", terms associated with spatial transmission such as "port", "antenna port", or "virtual antenna/port" can be used.

In terms of physical layer signals, the entity "beam" can be associated with one or two antenna ports, or one- or two-port non-zero-power (NZP) CSI-RS resource. Two ports are used, for instance, when dual-polarized antenna array is used at the transmitter. Other types of measurement RS can also be used, such as synchronization signal block (SSB) or demodulation RS (DMRS). If associated with an RS, the RS can provide a reference for measurement, precoding, and/or data transmission.

The first RR level (termed "cell") applies when a UE enters a network and therefore is engaged in an initial access procedure. In embodiment 510, a UE 511 is connected to serving cell 512 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 5, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, UE 511 can move within the network without observing cell boundaries as illustrated in embodiment 550. That is, UE mobility is handled on beam level rather than cell level, where one cell can be associated with N beams (N can be 1 or >1). Unlike cell, however, beam is a physical layer entity. Therefore, UE mobility management is handled solely on physical layer—hence requiring physical layer procedure(s) without MAC layer procedure(s).

An example of UE mobility scenario based on the second level RR is given in embodiment 550 of FIG. 5. After UE 511 is associated with the serving cell 512, UE 511 is further associated with beam 551. This is achieved by acquiring a beam or radio resource (RR) acquisition signal from which the UE can acquire a beam identity or identification. An example of beam or RR acquisition signal is a measurement reference signal (RS). When UE 511 moves to another cell, the boundary between the previous and the next cells is neither observed nor visible to UE 511. Instead of cell handover, UE 511 switches from beam 551 to beam 552. Such a seamless mobility is facilitated by the report from UE 511 to the network or associated TRP—especially when UE 511 reports a set of M>1 preferred beam identities by acquiring and measuring M beam (or RR) acquisition signals.

With seamless mobility and boundary-less network (beam-level access without cell boundaries), the conventional cell-specific antenna port framework is no longer suitable. For conventional cellular networks, all the UEs connected to a cell share the antenna ports generated by at least one TRP for that cell. When cell boundaries are neither observed nor "visible" to the UEs (as illustrated in FIG. 5), every UE in the network can potentially share any spatial-domain transmission resource generated from any of the TRPs in the network. Therefore, the conventional measurement antenna port (usually associated with CSI-RS), a cell-specific entity, and "CSI-RS resource" (an abstraction for defining measurement resource characterized in spatial, time, and frequency domain) are no longer appropriate. It is appropriate, however, to correlate this spatial-domain transmission resource with one antenna port, or one-port CSI-RS resource, or two antenna ports, or two-port CSI-RS resource. Two ports are used, for instance, when dual-polarized antenna array is used at the transmitter.

For this purpose, any control signaling required for configuration can be performed dynamically, either with L1 DL control signaling (via, e.g. PDCCH in NR) or L2 DL control signaling (via, e.g. MAC CE in NR). To ensure seamless mobility and boundary-less network, reconfiguration via higher-layer (L3/RRC) signaling is either minimized or avoided. The design below can be characterized as "flat" (as opposed to hierarchical). One radio resource unit can be defined in terms of one spatial unit (termed "beam" for illustrative purposes) and one time-frequency unit (for example, symbol-sub-carrier, slot-sub-carrier, slot-frequency resource block, etc.).

An example method for configuring DL MIMO can be described as follows. In this case, "beam" can be analogous to the conventional DL antenna port in terms of its function for MIMO-related transmission and measurement. Each beam can be associated with a CSI-RS which can span over one or multiple time-frequency units. In this setup, a UE connected to the network can be assigned to monitor or measure at least one beam. As the UE measures the channel quality via a reference signal (such as CSI-RS) associated with each of the beam(s), the UE can report CSI to the network. In turn, the network can perform scheduling and link adaptation to assign a DL transmission to the UE via the assigned beam(s) wherein some precoding for data transmission can be performed across the assigned beam(s). The beam assignment can be changed dynamically for the UE. In this embodiment, dynamic refers to the use of physical layer (L1) control signaling or at most MAC layer (L2) control signaling to effect the change in beam assignment. In addition, dynamic is to be contrasted with semi-static (wherein higher-layer/RRC/L3 signaling is used which can cause disruption in seamless access due to its associated latency) or static (unchanged).

Figure 6:
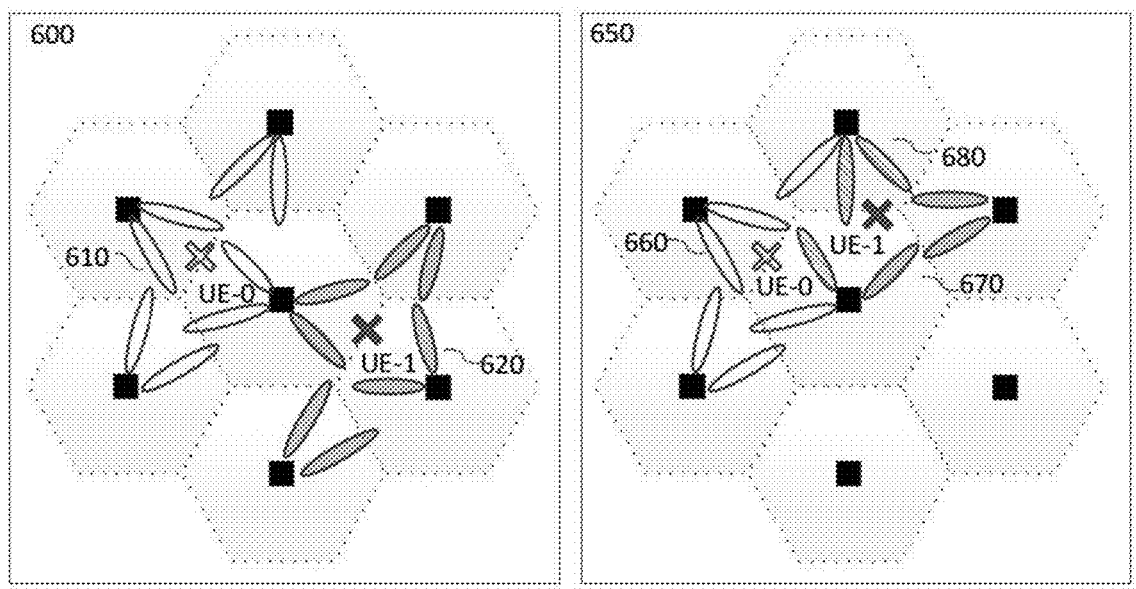
FIG. 6 illustrates an example embodiment of beam-level access and mobility for DL transmission and reception according to an embodiment of the present disclosure.

This embodiment can be illustrated in FIG. 6. In diagram 600, each of the two UEs (UE-0 and UE-1) is assigned to monitor a set of $L_k$=8 beams (610 for UE-0 and 620 for UE-1). The two 8-beam sets do not overlap. As UE-k (k=0 or 1) moves, the beam assignment (which can include the set of beams and/or the number of beams in the assigned set) can change. The change of beam assignment can be signaled to UE-k via L1 or L2 DL control signaling (for NR, it is PDCCH or MAC CE). If L1 control signaling is used, this beam assignment signaling can be included in a UE-specific downlink control information (DCI) or a UE-group DCI-masked or identified with a UE identification (such as C-RNTI) or a special group RNTI, respectively. The value of $L_k$ can be configured/assigned by the network (dynamically, signaled via L1/L2 DL control signaling).

If the two 8-beam sets in diagram 600 are non-overlapping, diagram 650 illustrates another example wherein $L_0$=8 and $L_1$=6 and, in addition, 3 of the beams assigned to the two UEs are shared (680). From the perspective of UE-0 3 out of 8 beams are shared with UE-1 and 5 are configured only to UE-0 (660). Likewise, from the perspective of UE-1 3 out of 6 beams are shared with UE-0 and 3 are configured only to UE-0 (670). Note that the setup can change from 600 to 650 as UE-1 moves from one geographical location to another.

To illustrate further, each of the UEs in diagram 600 monitors the 8 assigned beams by measuring 8 beam-specific RS associated with those 8 beams. This measurement is then used to calculate beam-specific metrics such as L1-RSRP or CSI (which can include RI, PMI, and/or CQI) which can be accompanied with at least one beam index (BI). In NR, BI is represented by CRI (CSI-RS resource index). If the entity of "CSI-RS resource" is not used, a different nomenclature which refers to either the "beam" or the corresponding RS is used. UE-k can report this measurement to the network for the purpose of link adaptation and scheduling. The reporting of beam-specific metrics can be initiated either by the network or the UE.

For the second component (that is, beam-specific DL measurement RS), a method for enabling beam-specific DL measurement RS, along with specific embodiments, is described below. This DL RS can be used for the calculation needed to perform beam reporting, CSI reporting, or both. For instance, it can be termed CSI-RS (analogous to NR, for instance, 1-port CSI-RS). Therefore, the DL measurement RS can be received and measured for the purpose of channel measurement, interference measurement, or a combination of the two.

Just as in the first component, dynamic signaling, referring to the use of physical layer (L1) control signaling or at most MAC layer (L2) control signaling, is used for configuration. Dynamic is to be contrasted with semi-static (wherein higher-layer/RRC/L3 signaling is used which can cause disruption in seamless access due to its associated latency) or static (unchanged).

A UE (UE-k) can be configured to receive and measure a measurement RS either periodically (with periodicity and time offset), semi-persistently (with periodicity and time offset between activation and deactivation/release), or aperiodically. This configuration can be dynamically signaled via L2 control signaling (such as MAC CE) or L1 control signaling (via DCI, whether UE-specific or UE-group-specific). When configured to receive aperiodic measurement RS, UE-k receives one instance of measurement RS upon dynamic indication—whether explicitly via DCI signaled on L1 DL control channel (or, optionally, L2 control signaling such as MAC CE), or implicitly together with a CSI/beam reporting request (signaled via DCI).

In one embodiment, separate RS configurations for channel measurement and interference measurement can be used wherein the RS used for channel and interference measurements are received and measured separately or independently. For interference measurement, the RS can be of zero or non-zero power. For channel measurement, the RS is of non-zero power. In this case, the required DL control signaling (to indicate the function of the RS, e.g. for channel or interference measurement) can include a configuration message, as well as a dynamic indication whether the RS is used for channel or interference measurement.

The configuration message can include, for instance, the RS time-frequency pattern, time-domain behavior (periodic, semi-persistent, or aperiodic), (for periodic or semi-persistent) periodicity and time offset. Either one RS configuration message (if the same RS can be used for either channel or interference measurement) or two separate RS configuration messages (one for channel measurement, the other for interference measurement) can be used.

For this embodiment, the dynamic indication can be performed as follows. When one configuration message is used for both channel and interference measurement, a DCI field for indicating whether the configured RS is for channel or interference measurement can be included in the DCI (either DL- or UL-related DCI, e.g. UL-related DCI that includes an aperiodic CSI request). In addition, other indication such as the energy setting of the RS (e.g. zero or non-zero power) can be included as well. When two separate messages are used for channel and interference measurements, a DCI field for indicating whether the configured RS is for channel or interference measurement can be included in the DCI (either DL- or UL-related DCI, e.g. UL-related DCI that includes an aperiodic CSI request). This field can be a one-bit indicator. The information in the dynamic indicator of RS functionality refers to the RS instance located in a particular slot (or, in general, scheduling time unit). This slot can be either the same slot (that includes the DCI field for the dynamic indication) or a different slot. If a different slot is used, the time offset between the DCI field for the dynamic indication and the RS location can either be configured (as a part of the configuration message) or dynamically signaled (either separately or as a part of the dynamic indication).

In another embodiment, one RS configuration for channel measurement and interference measurement can be used wherein the same (single) RS is used for both channel and interference measurements. Therefore, the RS is received and measured for both channel and interference. In this embodiment, the required DL control signaling (to indicate the function of the RS, e.g. for channel or interference measurement) can include a configuration message, as well as a dynamic indication whether the RS is used for channel or interference measurement.

The configuration message can include, for instance, the RS time-frequency pattern, RS energy setting, time-domain behavior (periodic, semi-persistent, or aperiodic), (for periodic or semi-persistent) periodicity and time offset. It follows that one RS configuration message can be used since the same RS can be used for either channel or interference measurement.

For this embodiment, several example RS (time-frequency) pattern designs (for a given "beam") are as follows. For the example embodiments below, the RS used for interference measurement can be "always ON" (always present) together with the RS used for channel measurement. Optionally, the RS component used for channel measurement can be turned ON or OFF (hence configurable).

In one example, non-zero-power RS is used for interference measurement and the RS energy setting (energy per resource element relative to a reference transmission) for interference measurement is the same as that for channel measurement. In this case, the time-frequency pattern of the RS is analogous to that of a typical RS design wherein all the REs of the RS are of the same energy setting. Dynamic indication (signaled via DCI) is used to indicate whether the RS is used for channel or interference measurement.

In another example, the RS energy setting (energy per resource element relative to a reference transmission) for interference measurement can be different from that for channel measurement. The RS energy setting for interference measurement can be non-zero (yet different value from that for channel measurement) or zero. In this case, the time-frequency pattern of the RS can be analogous to that of a typical RS design, except that some REs of the RS are of one energy setting while others are different energy setting. That is, an RS instance (for one beam) comprises N REs (in time-frequency), $N_C$ REs with energy setting $P_C$ are assigned for channel measurement, and $N_I=N-N_C$ REs with energy setting $P_I$ are assigned for interference measurement (where $P_I$ can be different from $P_C$).

In terms of the energy setting ($P_C$ and/or $P_I$), several possibilities are applicable. First, all the parameters for energy setting (for instance, $P_C$ and $P_I$) can be signaled to the UE in the configuration message. Second, a part of the parameters for energy setting (for instance, $P_C$) is signaled to the UE in the configuration message, whereas the other parameter(s) for energy setting (for instance, $P_I$ or the ratio $$\frac{P_I}{P_C}$$

either in linear or decibel scale) can be signaled to the UE via DCI—either as a part of the dynamic indication or a separate dynamic signaling. Third, all the parameters for energy setting (for instance, $P_C$ and $P_I$) can be signaled to the UE via DCI—either as a part of the dynamic indication or a separate dynamic signaling. In any of these possibilities, when all the parameters for energy setting are signaled together, a second parameter can be signaled in the form of its absolute value or relative to a first parameter.

In terms of how to configure the number of REs $N_C$ and/or $N_I$ (optionally, along with their respective locations), several possibilities are applicable. First, all these two parameters can be signaled to the UE in the configuration message. Second, one of these two parameters is signaled to the UE in the configuration message, whereas the other parameter can be signaled to the UE via DCI—either as a part of the dynamic indication or a separate dynamic signaling. Third, all these two parameters can be signaled to the UE via DCI—either as a part of the dynamic indication or a separate dynamic signaling. In any of these possibilities, instead of signaling these two parameters (the number of REs used for channel and interference measurement, respectively), one of these two parameters can be replaced with the total number of REs for the RS (N) or the RS density (assuming uniform RE spacing). The other parameter (which is not signaled) can be derived accordingly.

Configuration and/or dynamic signaling of the energy setting and the number of REs can be performed either separately or jointly whenever applicable.

Figure 7:
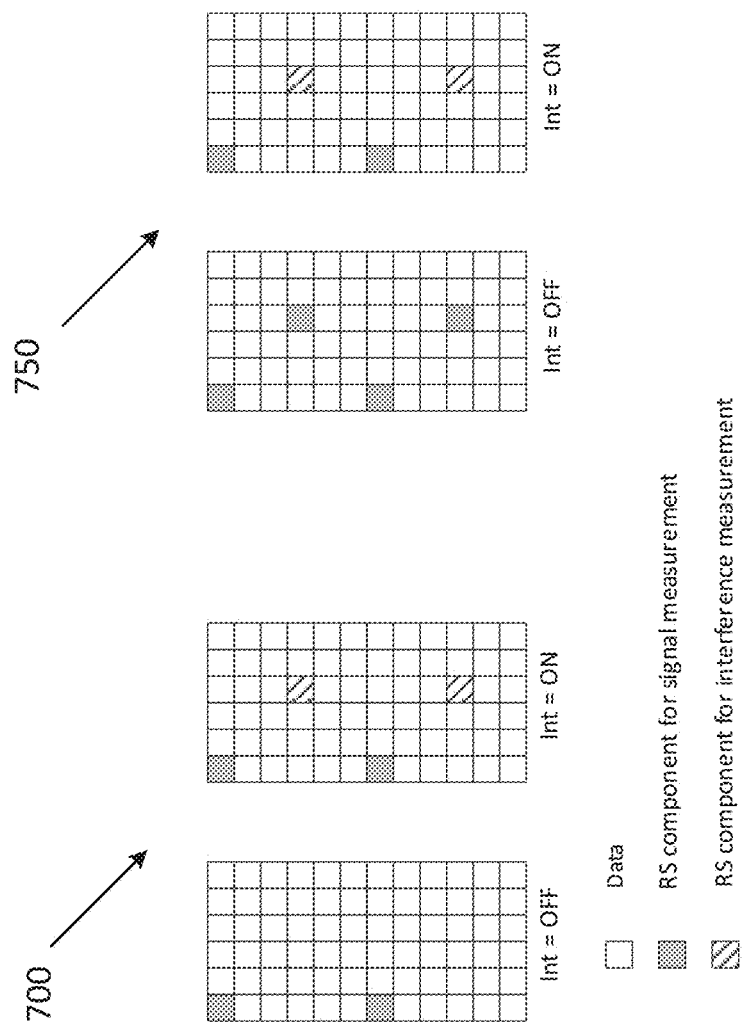
FIG. 7 illustrates two example embodiments of measurement RS according to an embodiment of the present disclosure.

The following are several time-frequency patterns of an RS design. In the example patterns below, both the RS component for channel and interference measurements can be present. FIG. 7 illustrates two examples. In diagram 700, the REs configured for interference measurement are used for data when interference measurement is turned off. In diagram 750, on the other hand, the REs configured for interference measurement are used for channel measurement when interference measurement is turned off. For these examples, 12 REs and 6 OFDM symbols are used for illustrative purposes.

Regardless whether 700 or 750 is used, the RS component for channel and interference measurements occupies one RS configuration and, when interference measurement is activated, one RS instance.

Figure 8:
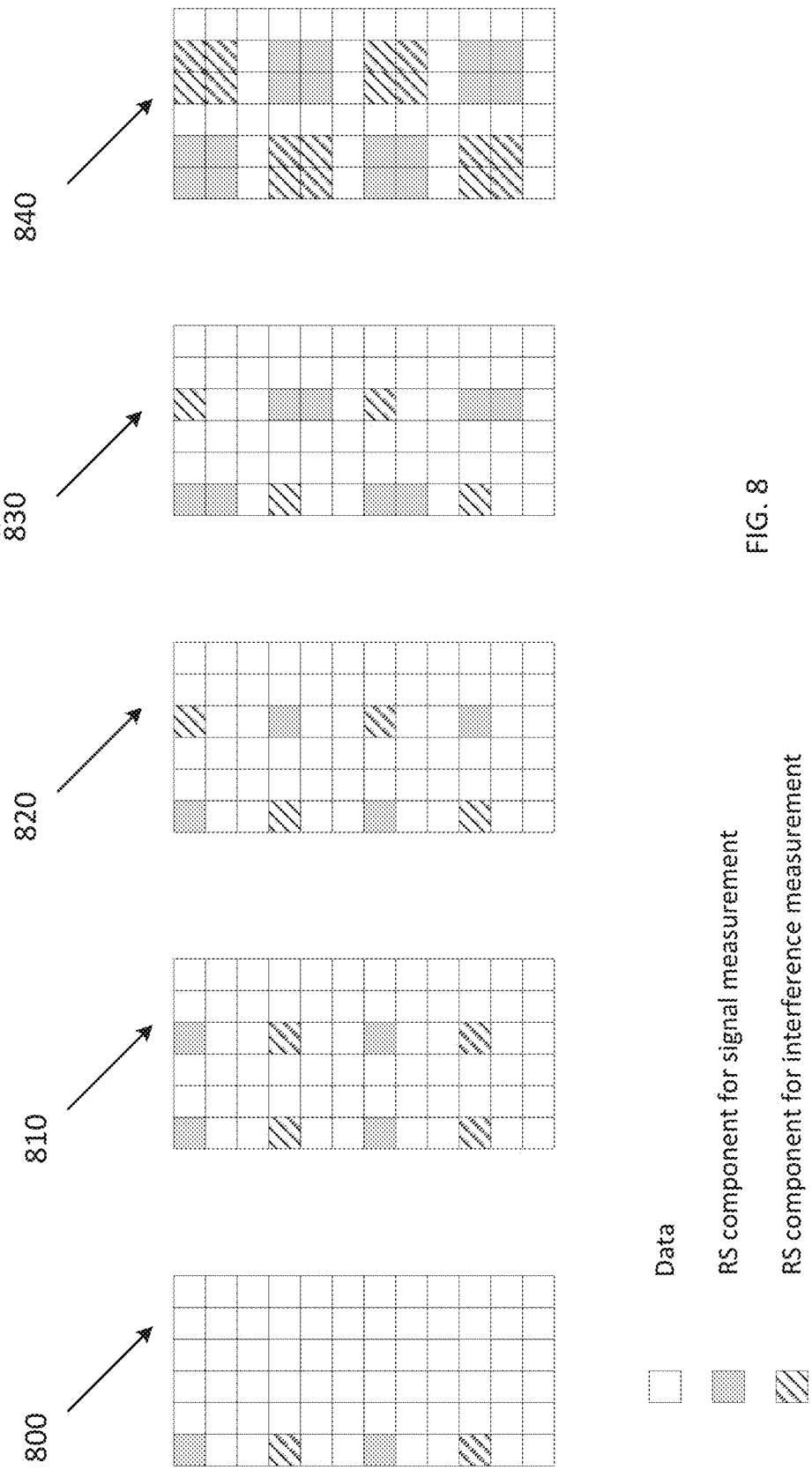
FIG. 8 illustrates five example embodiments of measurement RS according to an embodiment of the present disclosure.

In addition to the pattern illustrated in FIG. 7, in FIG. 8 below, some examples of RS pattern are illustrated with interference measurement turned ON. For these examples, 12 REs and 6 OFDM symbols are used. In patterns 800, 810, 820, and 840, the number of REs used for channel measurement is the same as that for interference measurement. In pattern 830, the number of REs used for channel measurement is twice than that for interference measurement.

The RS component for channel measurement can also occupy different parts of the bandwidth (or bandwidth part) than that for interference measurement, where the bandwidth part for channel or/and interference measurement can be configured in the configuration message or via DCI— either as a part of the dynamic indication or a separate dynamic signaling.

If a UE (UE-k) is configured to receive and measure N>1 measurement RS (for N>1 beams), the configuration can be according to at least one of the following alternatives.

In one alternative, N separate (independent) configurations are used to configure N RSs.

In another alternative, one common configuration is used to configure N RSs.

In another alternative, the configuration parameters (such as power or energy-per-RE values, number of REs, bandwidth parts, time-frequency patterns etc.) are divided into two sets (S1 and S2), and one common configuration is used to configure one of the two sets (e.g. S1) and N separate (independent) configurations are used to configure the other set (e.g. S2) for each of the N RSs. So, in total, N+1 configurations are used.

In another alternative, N beams are divided into M<N groups comprising $M_1, M_2, \ldots, M_N$ beams, where $M_1+M_2+ \ldots +M_N=N$, and one common configuration is used to configure $M_i$ RSs in the i-th group. So, in total, M configurations are used.

The above designs can also be extended to the design for UL RS.

For the third component (that is, control signaling), as described above, to enable MIMO access in seamless mobility and boundary-less network (wherein beam-level access can be performed without cell boundaries), the use of higher-layer (such as RRC) signaling for reconfiguration is to be minimized. As a consequence, the use of PHY layer and/or MAC layer (L1 and/or L2) control signaling becomes an essential enabling feature. Since L1/L2 control signaling imposes lower latency, reconfiguration can be performed dynamically. This, however, costs higher L1/L2 control signaling overhead. The associated overhead with more frequent use of L1 DL control signaling can be excessive if the signaling mechanism is not designed carefully.

To avoid excessive L1 DL control overhead, downlink control information (DCI) payload can be kept small. This can be done by minimizing the number of options for dynamic reconfiguration for which the DCI is used and/or efficiently designing PDCCH (especially that which enables efficient use of PDCCH resources).

Several embodiments for reducing the DCI payload are given as follows.

In one embodiment, only two time-domain behaviors for CSI-RS and CSI reporting (as well as, if applicable, beam-related reporting) are used: periodic (P) and aperiodic (AP). Periodic CSI-RS and/or CSI can be used for link maintenance and tracking. It is expected that the resolution is coarse (for instance, associated with small number of ports/beams, small codebook sizes, coarse quantization). A periodic CSI-RS or CSI is characterized by a time-unit (such as transmission time interval, slot, or subframe) offset and periodicity. Aperiodic CSI-RS and/or CSI can be used for high-performance link adaptation and scheduling.

An aperiodic CSI-RS/CSI can be triggered by the network and include one or multiple instances (shots). In this sense, this aperiodic behavior combines the conventional one-shot/burst aperiodic with multi-shot semi-persistent. By combining these two behaviors, the triggering procedure (for instance, signaled by a DCI field via an L1 control channel or L2 control) can indicate whether one or multiple shots/bursts of CSI-RS/CSI report occurs. Several example schemes are possible to implement this feature.

In a first example, the trigger (signaled by the network to the UE via either L1 or L2 DL control channel) includes a parameter indicating the number of shots or instances (in time) or 'bursts'. One shot corresponds to the conventional aperiodic whereas multiple shots to semi-persistent. The time offset between two shots can be configured via L2 signaling, higher-layer signaling, signaled in conjunction with the number of shots, or fixed/predetermined. This example can be illustrated in diagram 900 of FIG. 9A wherein aperiodic CSI reporting is triggered/requested. It is straightforward to those familiar with the art to extend this example to aperiodic CSI-RS transmission. Assuming that one slot constitutes one transmission or reception time interval, a DL slot 901 includes a DCI (transmitted in the DL control region) that includes a CSI request field or trigger. In this example, the trigger includes the number of shots/bursts wherein in the instance of DL slot 901, one CSI report is triggered. Upon receiving and decoding the DCI, the UE transmits the requested (one) CSI report in UL slot 911. On the other hand, a DL slot 902 includes a DCI with the trigger indicating 3 shots/bursts which the UE transmits across 3 consecutive UL slots 912.

Figure 9A:
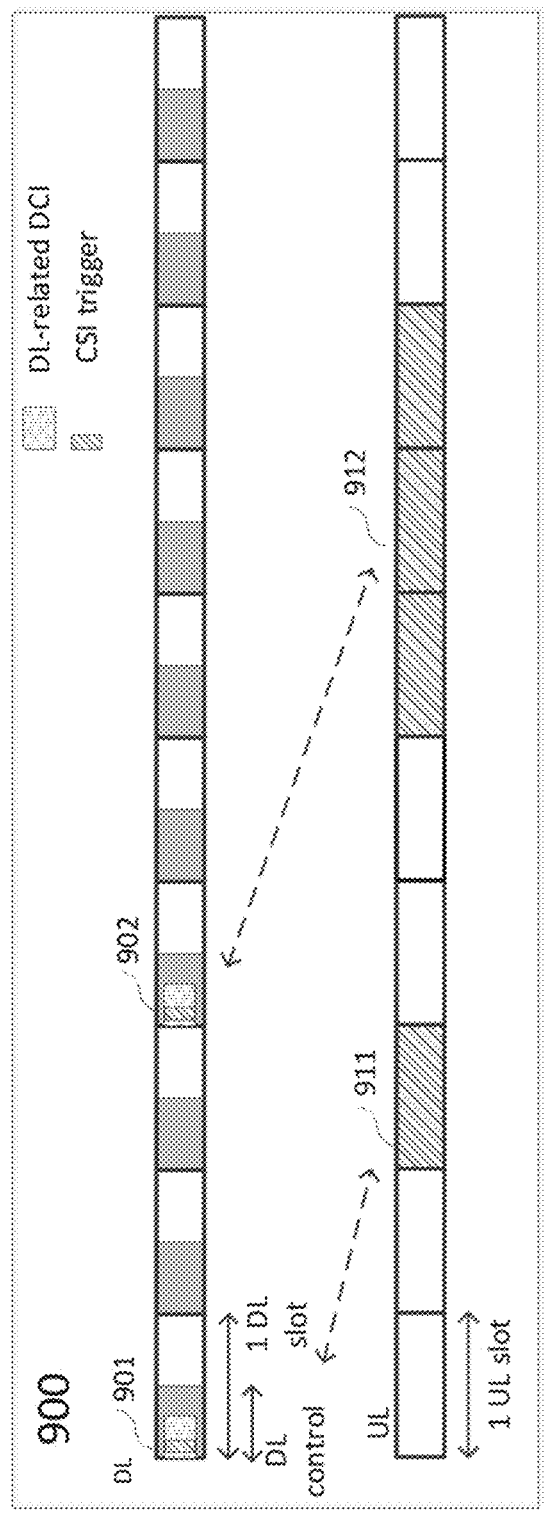
FIG. 9A illustrates an example embodiment of aperiodic triggering according to an embodiment of the present disclosure.

In the example in FIG. 9A, the UE transmits a burst of reports in several consecutive UL slots. It is also possible to configure the UE with a certain periodicity (that is, within one burst, the report is transmitted every X UL slots where X can be ≥1). Just as the time offset, this periodicity can be configured via L2 signaling, higher-layer signaling, signaled in conjunction with the number of shots, or fixed/predetermined.

In a second example, the trigger (signaled by the network to the UE via either L1 or L2 DL control channel) includes either an activation or a deactivation signal. Activation implies that the transmission occurs (for CSI-RS) or is requested to start (for CSI reporting) whereas deactivation implies that the transmission stops (for CSI-RS) or is requested to stop (for CSI reporting). Likewise, the time offset between two shots can be configured via L2 signaling, higher-layer signaling, signaled in conjunction with the number of shots, or fixed/predetermined. Several schemes can be conceived: Scheme 1) the A/D (activation/deactivation) field comprises two values—activate and deactivate. In this case, two triggers are required for any aperiodic transmission even for one shot; Scheme 2) the A/D (activation/deactivation) field comprises three values—one shot, activate. and deactivate. In this case, two triggers are required only for multi-shot transmission; Scheme 3) any combination of the two whereas the A/D message can be jointly signaled or encoded with another trigger-related message.

Figure 9B:
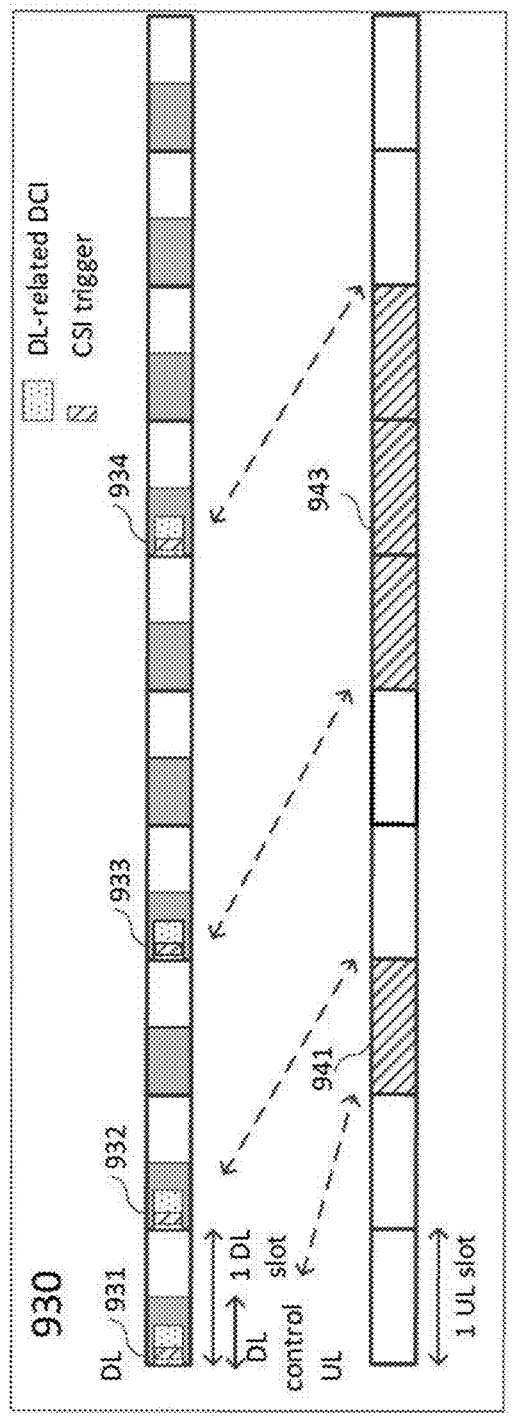
FIG. 9B illustrates an example embodiment of aperiodic triggering according to an embodiment of the present disclosure.

The second scheme can be illustrated in diagram 930 of FIG. 9B wherein aperiodic CSI is triggered/requested. It is straightforward to those familiar with the art to extend this example to aperiodic CSI-RS transmission. Assuming that one slot constitutes one transmission or reception time interval, a DL slot 931 includes a DCI (transmitted in the DL control region) that includes a CSI request field or trigger. In this example, the trigger includes activation/deactivation message wherein in the instance of DL slots 931 and 932, one CSI report is triggered via two consecutive A/D messages (activation in 931 and deactivation in 932). Upon receiving and decoding the DCIs, the UE transmits the requested (one) CSI report in UL slot 941. On the other hand, a DL slot 933 includes a DCI with the trigger indicating CSI report activation which is deactivated 3 slots later using the DCI in DL slot 934. Responding to this, the UE transmits 3 bursts/shots of CSI report across 3 consecutive UL slots 943.

In the example in FIG. 9B, the UE transmits a burst of reports in several consecutive UL slots. It is also possible to configure the UE with a certain periodicity (that is, within one burst, the report is transmitted every X UL slots where X can be ≥1). Just as the time offset, this periodicity can be either be configured via L2 signaling or higher-layer signaling or signaled in conjunction with the number of shots, or fixed/predetermined.

Figure 9C:
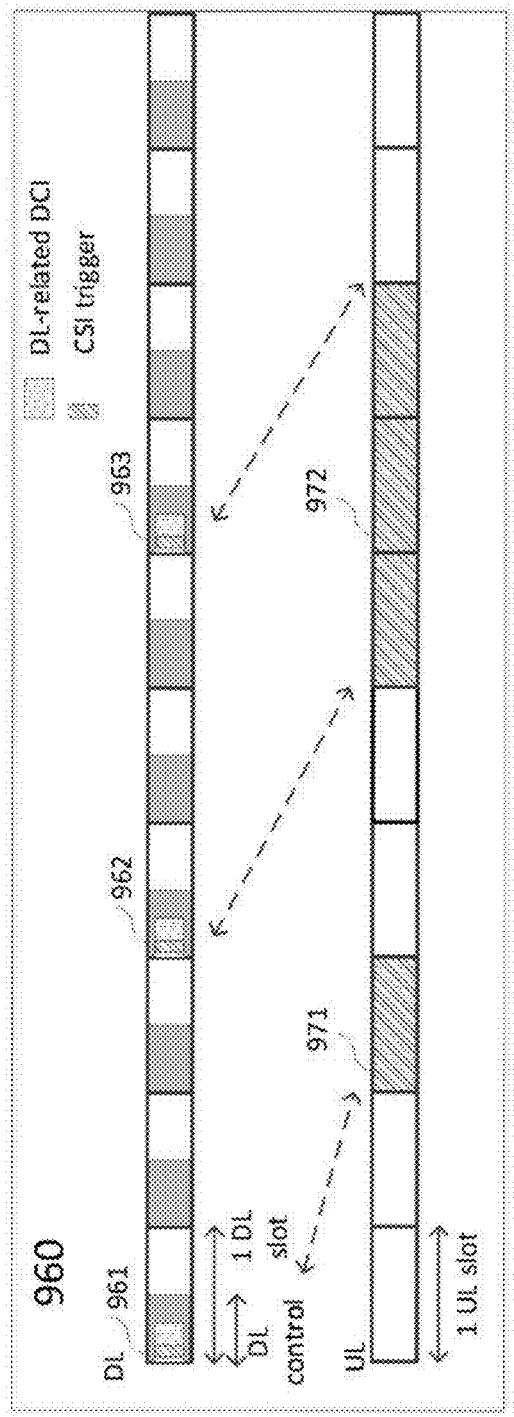
FIG. 9C illustrates an example embodiment of aperiodic triggering according to an embodiment of the present disclosure.

The third scheme can be illustrated in diagram 960 of FIG. 9C wherein aperiodic CSI is triggered/requested. It is straightforward to those familiar with the art to extend this example to aperiodic CSI-RS transmission. Assuming that one slot constitutes one transmission or reception time interval, a DL slot 961 includes a DCI (transmitted in the DL control region) that includes a CSI request field or trigger. In this example, the trigger includes 1-shot/activation/deactivation message wherein in the instance of DL slots 961, one-shot CSI report is triggered. Upon receiving and decoding the DCI, the UE transmits the requested (one) CSI report in UL slot 971. On the other hand, a DL slot 962 includes a DCI with the trigger indicating CSI report activation which is deactivated 3 slots later using the DCI in DL slot 963. Responding to this, the UE transmits 3 bursts/shots of CSI report across 3 consecutive UL slots 972.

In the example in FIG. 9C, the UE transmits a burst of reports in several consecutive UL slots. It is also possible to configure the UE with a certain periodicity (that is, within one burst, the report is transmitted every X UL slots where X can be ≥1). This periodicity can be either be configured via L2 signaling or higher-layer signaling or signaled in conjunction with the number of shots, or fixed/predetermined. Likewise, the time offset between two shots can either be configured via L2 signaling or higher-layer signaling or signaled in conjunction with the number of shots, or fixed/predetermined.

In one embodiment, the use of DCI that includes common configuration information for a group of UEs (UE-group DCI) can be used in conjunction with UE-specific DCI. By using UE-group DCI, excessive use of UE-specific DCI can be avoided. Such UE-group-common information can include broadcast information, QCL state and/or RS configuration information.

In one example, UE-group DCI and N UE-specific DCIs associated with one group can correspond to (N+1) different DCIs transmitted using two different PDCCH resources.

Figure 10:
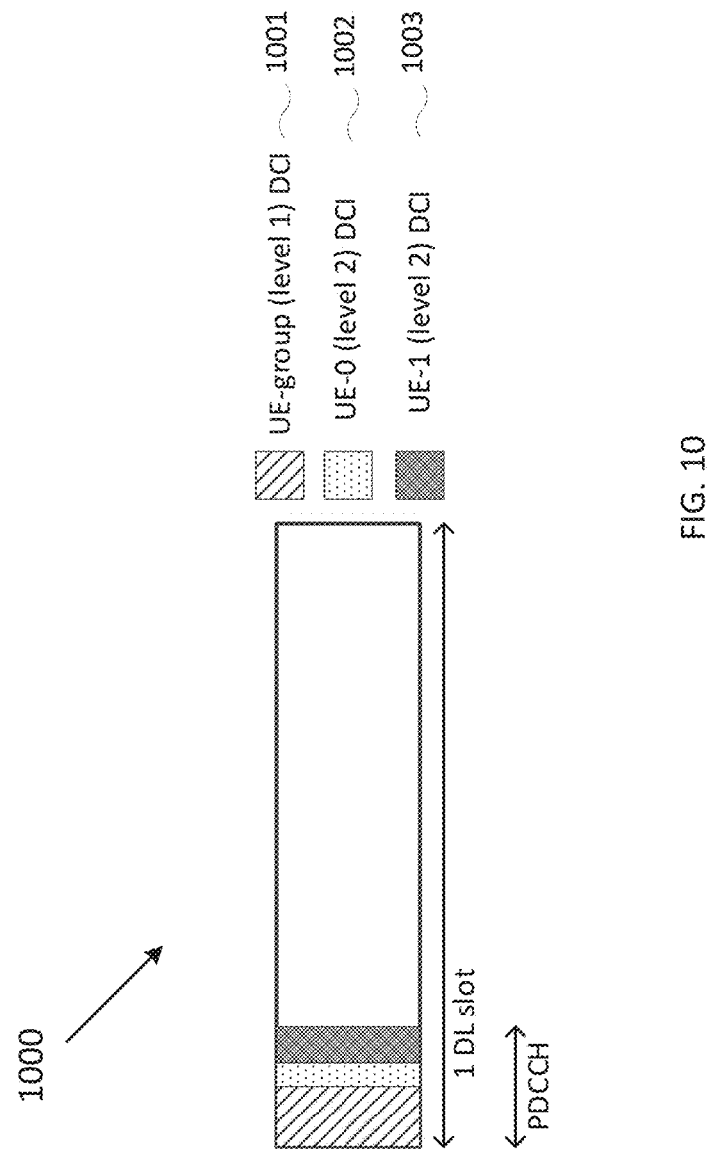
FIG. 10 illustrates an example embodiment of DCI design according to an embodiment of the present disclosure.

In another example, UE-group DCI and N UE-specific DCIs associated with one group can correspond to one multi-level DCI transmitted using one PDCCH resource. The UE-group DCI can be designed to be of a constant payload for a given higher-layer (such as either RRC or broadcast channel such as system information) configuration and hence the first level of the multi-level DCI. The N UE-specific DCIs correspond to the second level wherein the payload of each of the N UE-specific DCIs can differ and/or change for a given higher-layer (such as RRC) configuration. The payload of UE-specific DCI n (=0, 1, . . . , N−1) can be indicated in the first-level (UE-group DCI). Optionally, the UE-group DCI can include some information on the UE IDs associated with the N UEs (hence an indication of the presence of a UE-specific DCI for a UE). The UE-specific (level 2) DCI can include DL-assignment or UL-grant-specific information for a scheduled UE. This example is illustrated in FIG. 10 wherein a UE-group DCI 1001 is multiplexed with two UE-specific DCIs (1002 and 1003). In this example, the three DCIs are assigned time-domain-multiplexed portions of PDCCH resource for the associated DL slot. Extending this to examples where frequency-domain and/or spatial-domain multiplexing are used in addition or in lieu of time-domain multiplexing is straightforward to those familiar with the art. Upon receiving the DL slot 1000, the UE first decodes the UE-group DCI 1001 (hence a level 1 DCI). The payload of the UE-group DCI remains the same for a given higher-layer (such as either RRC or broadcast channel such as system information) configuration. Based on the content of UE-group DCI 1001 (which can include UE-group configuration information and the presence of a level-2 DCI for the UE), the UE is informed the presence of an associated level-2 UE-specific DCI and, if present, the payload and its location (or possible location or search space) within PDCCH. In this illustration, two UE-specific DCIs are multiplexed with the UE-group DCI.

For any of the above examples, an embodiment is applicable wherein UE-group DCI can be used to carry/signal some information on the beam assignment (in the first component), wherein UE-n (n=0, 1, ..., N−1 where N is the number of UEs in the associated UE group) is configured to monitor $L_n$ beams. This signaling can be performed, for instance, with the following schemes.

In a first scheme, given a total/maximum number of $L_{TOT}$ beams that can be configured to a UE (this number can be associated with the number of CSI-RS or SSB or, in general, measurement RS resources), N length-$L_{TOT}$ bitmaps (each for one UE) can be signaled via the UE-group DCI where 1 indicates an assignment of a beam/resource and 0 otherwise. Optionally, the N bitmaps can be signaled as one N×$L_{TOT}$ rectangular bitmap.

In a second scheme (a variation of the first scheme), given a total/maximum number of $L_{TOT}$ beams that can be configured to a UE (this number can be associated with the number of CSI-RS or SSB or, in general, measurement RS resources), N indicators (each for one UE) can be signaled via the UE-group DCI where the indicator for UE-n indicates a set of beam or resource indices configured for the UE-n. When the number of possible sets is $S_n$ (for UE-n), the length of the indicator is $\lceil \log_2(S_2) \rceil$ bits. For instance, if the maximum number of beams or resources UE-n can be configured with is $$L_{n,max}, S_n = \sum_{l=1}^{L_{n,max}} \binom{L_{TOT}}{l}.$$

In a third scheme, suitable when all the UEs in this group share the same beam/resource assignment (using the notation in the second scheme: $S_n$=S), a length–$\lceil \log_2(S) \rceil$ (bits) indicator can be signaled via the UE-group DCI. When the number of possible sets is S (for all the UEs), the length of the indicator is $\lceil \log_2(S) \rceil$ bits. For instance, if the maximum number of beams or resources UE-n can be configured with is $$L_{max}, S_n = \sum_{l=1}^{L_{max}} \binom{L_{TOT}}{l}.$$

In any of the above schemes for this embodiment, the set of UE IDs associated with the UE group can be signaled via higher-layer signaling or paging channel or included in the UE-group DCI in the form of a UE-group RNTI (either as a scrambling sequence or CRC). Optionally, some type of temporary UE IDs can be configured and included in the UE-group DCI.

For the fourth and the fifth components, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

In one example illustrated in diagram 1100 of FIG. 11, pertaining to SP-CSI-RS, upon receiving the activation message in DL slot 1110, after a certain timing offset "Offset 1" (representing the predefined latency between the reception of the message and the first response of the UE), the UE starts receiving DL transmission 1101 and measuring the SP-CSI-RS at designated instances indicated by 1120 (slots, subframes, or symbols—in this example slot is used). The designated instances can be signaled to the UE together or separately from the activation message, or pre-defined/pre-configured (fixed or via higher layer signaling, or relative to the activation message) which include a starting instance (in this example, the location of 1110+"Offset 1"), periodicity (in this example, 5 slots), and time offset (relative to an absolute reference such as slot number/index). The UE keeps receiving and measuring the SP-CSI-RS. When the UE receives a deactivation message transmitted in DL slot 1130 which can be accompanied with information on a stopping instance (else, the stopping instance is pre-defined or pre-configured, or relative to the deactivation message), after a certain timing offset "Offset 2" (which can be the same or different from "Offset 1"), the UE stops receiving and measuring the SP-CSI-RS at the designated stopping instance—despite the possible presence of CSI-RS in subsequent DL transmission.

In another example illustrated in diagram 1200 of FIG. 12, pertaining to SP-CSI reporting, upon receiving the activation message in DL slot 1210 in the DL transmission 1201, after a certain timing offset "Offset 1" (representing the predefined latency between the reception of the message in the UL transmission 1202 in 1215 and the first response of reporting SP-CSI by the UE), the UE starts reporting the SP-CSI at designated instances indicated by 1220 (slots, subframes, or symbols—in this example slot is used). The designated instances can be signaled to the UE together or separately from the activation message, or pre-defined/pre-configured (fixed or via higher layer signaling, or relative to the activation message) which include a starting instance (in this example, the location of 1210+"Offset 1"), periodicity (in this example, 5 slots), and time offset (relative to an absolute reference such as slot number/index). The UE keeps reporting the SP-CSI. When the UE receives a deactivation message transmitted in DL slot 1230 (received in 1235) which can be accompanied with a stopping instance (else, the stopping instance is pre-defined or pre-configured, or relative to the deactivation message), after a certain timing offset "Offset 2" (which can be the same or different from "Offset 1"), the UE stops reporting the SP-CSI at (or right after) the designated stopping instance.

For the fourth component (that is, SP activation/deactivation), activation and deactivation mechanisms for semi-persistent CSI-RS (and, whenever applicable, CSI reporting) where activation uses a different signaling mechanism from deactivation are described. Two example embodiments are summarized in TABLE 1.

TABLE 1

Activation/deactivation of SP-CSI-RS

| Embodiment | Activation | Deactivation |
|---|---|---|
| I. 1 | DCI signaled via L1 control channel | MAC CE signaled via L2 control |
| I. 2 | MAC CE signaled via L2 control | DCI signaled via L1 control channel |
| I. 3 | DCI signaled via L1 control channel, UE-specific | DCI signaled via L1 control channel, UE-group-specific |
| I. 4 | DCI signaled via L1 control channel, UE-group-specific | DCI signaled via L1 control channel, UE-specific |
| I. 5 | DCI signaled via L1 control channel, UE-group-specific | DCI signaled via L1 control channel, UE-group-specific |

In one embodiment (IV.1), SP-CSI-RS is activated using DCI signaled via a L1 DL control channel and deactivated using MAC CE signaling via L2 control. This particular scheme is especially relevant when the activation of SP-CSI-RS is latency-sensitive while deactivation is not. Referring to FIG. 11, it is expected that "Offset 1" is smaller than "Offset 2".

The DCI used for activation can be UL-related (carrying an UL grant) or DL-related (carrying a DL assignment). In addition, it can be UE-specific or UE-group-specific. UE-group-specific DCI can be used to save the DCI overhead by activating the SP-CSI-RS for a group of UEs instead of only one UE. This is especially relevant for highly loaded cells. This UE-specific DCI can be masked with a group ID such as group RNTI, included, for instance, as a CRC mask. Here, a DCI field can be used to indicate the function(s) of the DCI wherein one of the functions is to activate SP-CSI-RS for the UE group. As an example, a UE-group DCI can include an indicator as one of its DCI fields where the indicator signifies the included functions in the DCI. If there are N possible functions of the UE-group DCI (which can be configured via higher-layer or broadcast signaling), an N-bit bitmap can be used (where 1 at the n-th position signifies that the n-th configured functionality is included, such as activation or deactivation of SP-CSI-RS).

In another embodiment, SP-CSI-RS is deactivated using DCI signaled via a L1 DL control channel and activated using MAC CE signaling via L2 control. This particular scheme is especially relevant when the deactivation of SP-CSI-RS is latency-sensitive while activation is not. Referring to FIG. 11, it is expected that "Offset 1" is larger than "Offset 2".

The DCI used for deactivation can be UL-related (carrying an UL grant) or DL-related (carrying a DL assignment). In addition, it can be UE-specific or UE-group-specific. UE-group-specific DCI can be used to save the DCI overhead by deactivating the SP-CSI-RS for a group of UEs instead of only one UE. This is especially relevant for highly loaded cells. This UE-specific DCI can be masked with a group ID such as group RNTI, included, for instance, as a CRC mask. Here, a DCI field can be used to indicate the function(s) of the DCI wherein one of the functions is to deactivate SP-CSI-RS for the UE group. As an example, a UE-group DCI can include an indicator as one of its DCI fields where the indicator signifies the included functions in the DCI. If there are N possible functions of the UE-group DCI (which can be configured via higher-layer signaling), an N-bit bitmap can be used (where 1 at the n-th position signifies that the n-th configured functionality is included, such as deactivation of SP-CSI-RS).

The following examples are relevant for various embodiments.

Figure 13:
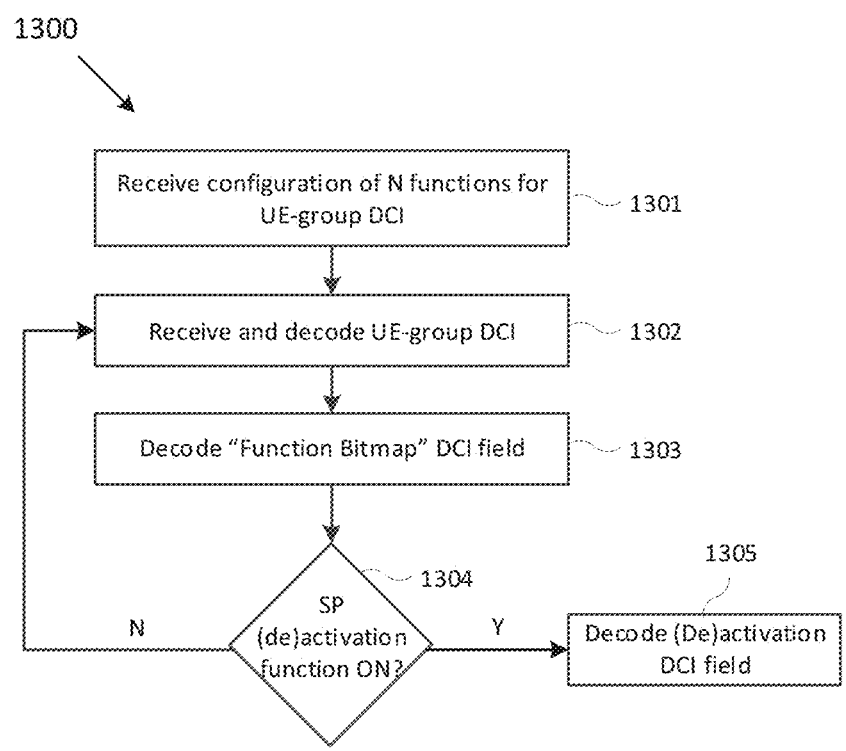
FIG. 13 illustrates an example embodiment of semi-persistent activation and deactivation algorithm according to an embodiment of the present disclosure.

An example UE procedure of utilizing UE-group DCI for activation and/or deactivation of SP-CSI-RS (which can also be extended for SP-CSI) is illustrated in diagram 1300 of FIG. 13. In step 1301, a UE receives configuration information of N ($\geq 1$) functions for UE-group DCI. This configuration information can be signaled to the UE via higher-layer (e.g. RRC) signaling. Optionally, instead of using a UE-specific configuration, this configuration information can be signaled as a cell-specific or UE-group-specific configuration information via a broadcast channel (e.g. included in the Master Information Block or System Information). Upon receiving the configuration information, the UE can infer the size/payload of the associated UE-group DCI. This payload can comprise either a single/unique value or a plurality of possible values. In case of a plurality of values, the resulting number of blind decodes for PDCCH may increase. When the UE detects an associated UE-group DCI (e.g. via the covering/scrambling of PDCCH CRC), the associated L1 DL control signal is received and decoded (step 1302), including the DCI field for the function indicator (for example, an N-bit bitmap) (step 1303, followed by step 1304). If the DCI field indicates that the SP activation/deactivation function is "ON", the UE can proceed to interpret/decode the SP activation/deactivation DCI field (step 1305). Otherwise the UE continues searching for subsequent UE-group DCI signaling.

When used for SP-CSI-RS, the corresponding group of UEs are configured with a same set of one or more CSI-RS resources. This set of resource(s) can be configured either via higher-layer signaling (in a UE-specific manner) or broadcast signaling/channel (in either a group or a cell-specific manner).

In this example, a few optional definitions for SP activation/deactivation function can be perceived. For illustrative purposes, some embodiments are assumed where activation is performed via DCI. Extension to another embodiment is performed where deactivation is performed via DCI.

In a first option, the SP function indication and the SP activation indication can be jointly encoded into one DCI field. In this case, the N-bit "function bitmap" is not used. Instead, one DCI field for SP function (whether for SP-CSI-RS or SP-CSI). This can be illustrated in TABLE 2A wherein the SP function DCI field includes 2 hypotheses. The number of hypotheses can be increased if more than one SP-CSI reports or more than one CSP-CSI-RS resources are configured. For instance, if M SP-CSI-RS resources are configured, the number of code points (hence hypotheses) is $M^2+1$. In a second option, the SP function indication and the SP activation indication are separately encoded into two DCI fields as illustrated in TABLE 2B wherein the required number of hypotheses for the SP (de)activation is $M^2$ for M configured SP-CSI-RS resources. Here, when M=1, two DCI fields for these two separate functions are unnecessary.

TABLE 2A

Activation mechanism for SP function-option 1

| Code point of SP function DCI field | Interpretation/hypothesis |
|---|---|
| 0 | SP function OFF |
| 1 | SP function ON, activate |

TABLE 2B

Activation mechanism for SP function-option 2

| Code point of SP function DCI field | Code point of SP activation/deactivation DCI field | Interpretation/hypothesis |
|---|---|---|
| 0 | 0 | SP function OFF |
|   | 1 |   |
| 1 | 0 | SP function ON, nothing activated |
|   | 1 | SP function ON, activate |

In one embodiment, SP-CSI-RS is activated using UE-specific DCI signaled via a L1 DL control channel and deactivated using UE-group-specific DCI, also signaled via a L1 DL control channel. This particular scheme is especially relevant when the activation of SP-CSI-RS tends to be individual yet deactivation collective—although both are time-sensitive.

In another embodiment, SP-CSI-RS is deactivated using UE-specific DCI signaled via a L1 DL control channel and activated using UE-group-specific DCI, also signaled via a L1 DL control channel. This particular scheme is especially relevant when the deactivation of SP-CSI-RS tends to be individual yet activation collective—although both are time-sensitive.

In another embodiment, SP-CSI-RS is both activated and deactivated using UE-group-specific DCI signaled via a L1 DL control channel. This particular scheme is especially relevant when both activation and deactivation of SP-CSI-RS tend to be collective and time-sensitive.

When used for SP-CSI-RS, the corresponding group of UEs are configured with a same set of one or more CSI-RS resources. This set of resource(s) can be configured either via higher-layer signaling (in a UE-specific manner) or broadcast signaling/channel (in either a group or a cell-specific manner).

In this example, a few optional definitions for the above SP activation/deactivation function can be perceived.

In a first option, the SP function indication and the SP (de)activation indication can be jointly encoded into one DCI field. In this case, the N-bit "function bitmap" is not used. Instead, one DCI field for SP function (whether for SP-CSI-RS or SP-CSI). This can be illustrated in TABLE 3A wherein the SP function DCI field includes three hypotheses. The number of hypotheses can be increased if more than one SP-CSI reports or more than one CSP-CSI-RS resources are configured. For instance, if M SP-CSI-RS resources are configured, the number of code points (hence hypotheses) is M(M+1)+1. In a second option, the SP function indication and the SP (de)activation indication are separately encoded into two DCI fields as illustrated in TABLE 3B wherein the required number of hypotheses for the SP (de)activation is M(M+1) for M configured SP-CSI-RS resources.

TABLE 3A

Activation/deactivation mechanism for SP function-option 1

| Code point of SP function DCI field | Interpretation/hypothesis |
|---|---|
| 0 | SP function OFF |
| 1 | SP function ON, activate |
| 2 | SP function ON, deactivate |

TABLE 3B

Activation/deactivation mechanism for SP function-option 2

| Code point of SP function DCI field | Code point of SP activation/deactivation DCI field | Interpretation/hypothesis |
|---|---|---|
| 0 | 0 | SP function OFF |
|   | 1 |   |
| 1 | 0 | SP function ON, activate |
|   | 1 | SP function ON, deactivate |

For the fifth component (that is, activation/deactivation of SP-CSI-RS and SP-CSI), SP-CSI-RS activation/deactivation is associated with CSI reporting. For SP-CSI-RS, only SP-CSI and aperiodic (AP)-CSI reporting apply.

In the following embodiments, DCI-based activation/deactivation is assumed for illustrative purposes—either UE-specific or UE-group-specific. When appropriate, MAC-CE-based activation/deactivation can also be used.

A first embodiment can be used when a UE is configured with SP-CSI-RS and A-CSI. Since SP-CSI-RS is required to calculate A-CSI, A-CSI is triggered either after or at the same time as the activation of the corresponding SP-CSI-RS. When A-CSI is triggered at the same time instance as SP-CSI-RS activation, SP-CSI-RS activation can be signaled with A-CSI request (trigger) in the same DCI (hence the same slot/subframe) transmitted via L1 DL control channel. The joint SP-CSI-RS activation/A-CSI triggering can be done either using the same DCI field or two separate DCI fields (one for SP-CSI-RS activation/deactivation, another for A-CSI request). When it is done using the same DCI field, the mapping between the code points of the DCI field and the trigger state of A-CSI (CSI reporting index) and SP-CSI-RS (activation/deactivation, CSI-RS resource index) can be configured either via higher-layer signaling, broadcast, or L2 control signaling (MAC CE). An example is given in TABLE 4A where two NZP CSI-RS resources are configured as SP-CSI-RS for the A-CSI reporting. Note that code points 5 and 6 are valid since the UE can receive and decode the DCI in the same or next slot/subframe and calculate the requested A-CSI before the SP-CSI-RS is deactivated.

TABLE 4A

Example of joint activation/deactivation of SP-CSI-RS and A-CSI request

| Code point of DCI field | SP-CSI-RS | A-CSI |
|---|---|---|
| 0 | SP function OFF | No request |
| 1 | SP function ON, deactivate resource index 0 | No request |
| 2 | SP function ON, deactivate resource index 1 | No request |
| 3 | SP function ON, activate resource index 0 | Request A-CSI |
| 4 | SP function ON, activate resource index 1 | Request A-CSI |
| 5 | SP function ON, deactivate resource index 0 | Request A-CSI |
| 6 | SP function ON, deactivate resource index 1 | Request A-CSI |

Another embodiment can be used when a UE is configured with SP-CSI-RS and SP-CSI. Since SP-CSI-RS is required to calculate SP-CSI, SP-CSI is activated either after or at the same time as SP-CSI-RS activation. Likewise, SP-CSI is activated either before or at the same time as SP-CSI-RS activation.

In one sub-embodiment, SP-CSI is activated and deactivated at the same time instance as its corresponding SP-CSI-RS. In this case, SP-CSI-RS activation/deactivation can be signaled with SP-CSI activation/deactivation in the same DCI (hence the same slot/subframe) transmitted via L1 DL control channel. The joint SP-CSI-RS/SP-CSI activation/deactivation can be done either using the same DCI field or two separate DCI fields (one for SP-CSI-RS activation/deactivation, another for A-CSI request). When it is done using the same DCI field, the mapping between the code points of the DCI field and the SP-CSI reporting index+SP-CSI-RS (activation/deactivation, CSI-RS resource index) can be configured either via higher-layer signaling, broadcast, or L2 control signaling (MAC CE). An example is given in TABLE 5A where two NZP CSI-RS resources are configured as SP-CSI-RS for the SP-CSI reporting.

TABLE 5A

Example of joint activation/deactivation of SP-CSI-RS and A-CSI request

| Code point of DCI field | SP-CSI-RS | SP-CSI |
|---|---|---|
| 0 | SP function OFF | |
| 1 | Activate resource index 0 | No SP-CSI activation |
| 2 | Activate resource index 1 | No SP-CSI activation |
| 3 | Activate resource index 0 | Activate SP-CSI |
| 4 | Activate resource index 1 | Activate SP-CSI |
| 5 | Deactivate resource index 0 | Deactivate SP-CSI |
| 6 | Deactivate resource index 1 | Deactivate SP-CSI |

In another sub-embodiment, SP-CSI can be activated or deactivated at a different time instance from its corresponding SP-CSI-RS. In this case, SP-CSI-RS activation/deactivation can be signaled with SP-CSI activation/deactivation in different DCIs (hence different slots/subframes) transmitted via L1 DL control channel. Although the DL control signaling can be done separately, SP-CSI-RS is required to calculate SP-CSI, SP-CSI is activated either after or at the same time as SP-CSI-RS activation. Likewise, SP-CSI is activated either before or at the same time as SP-CSI-RS activation. For instance, if SP-CSI is activated before the activation of the corresponding SP-CSI-RS (the correspondence can be either higher-layer configured or broadcast or UE-group signaled), this will be considered an error (invalid) case. Likewise, if SP-CSI-RS is deactivated before the deactivation of the corresponding SP-CSI (the correspondence can be either higher-layer configured or broadcast or UE-group signaled), this will be considered an error (invalid) case.

Combinations of joint and separate activation/deactivation for SP-CSI-RS and SP-CSI can also be inferred from the above description.

For example, SP-CSI is activated at the same time instance as its corresponding SP-CSI-RS but SP-CSI can be deactivated at a different time instance from its corresponding SP-CSI-RS. In this case, SP-CSI-RS activation can be signaled with SP-CSI activation in the same DCI (hence the same slot/subframe) transmitted via L1 DL control channel. But SP-CSI-RS deactivation can be signaled separately from SP-CSI deactivation in the different DCI (hence different slot/subframe).

For example, SP-CSI is deactivated at the same time instance as its corresponding SP-CSI-RS but SP-CSI can be activated at a different time instance from its corresponding SP-CSI-RS. In this case, SP-CSI-RS deactivation can be signaled with SP-CSI activation in the same DCI (hence the same slot/subframe) transmitted via L1 DL control channel. SP-CSI-RS deactivation can be signaled separately from SP-CSI deactivation in the different DCI (hence different slot/subframe).

Any of the above variation embodiments can be utilized independently or in combination with at least one other variation embodiment.

Figure 14:
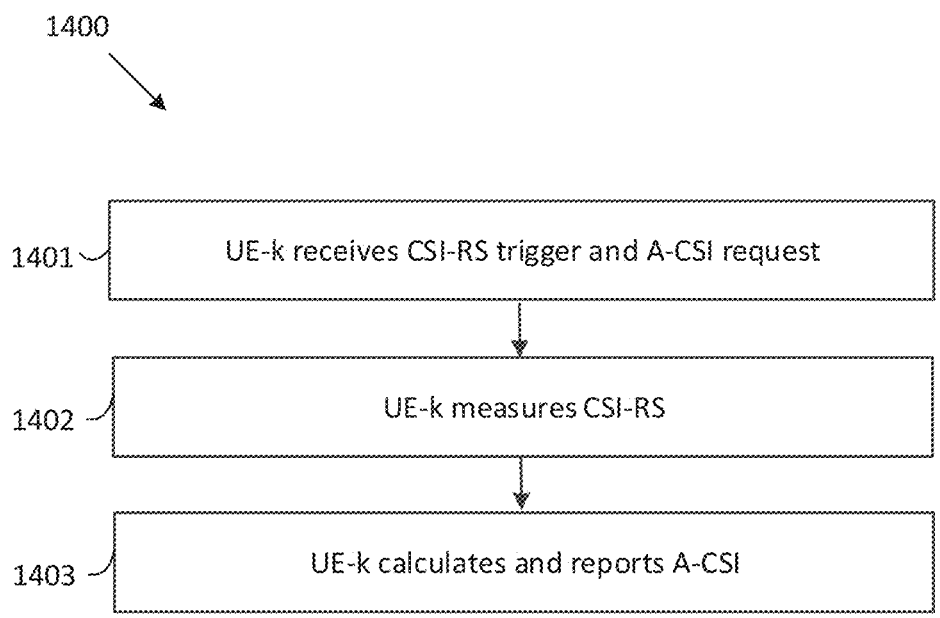
FIG. 14 illustrates a flowchart for an example method wherein a UE receives CSI-RS trigger and aperiodic CSI request according to an embodiment of the present disclosure.

FIG. 14 illustrates a flowchart for an example method 1400 wherein a UE receives CSI-RS trigger and A-CSI request according to an embodiment of the present disclosure. For example, the method 1400 can be performed by the UE 116.

The method 1400 begins with the UE receiving, from a base station, and decoding CSI-RS trigger and aperiodic CSI (A-CSI) request (step 1401). In one example, the CSI-RS trigger includes at least three hypotheses (or interpretations) wherein the three hypotheses are to measure one instance of CSI-RS, activate CSI-RS, and deactivate CSI-RS. Optionally, the hypotheses correspond to different numbers of CSI-RS instances (which can be distributed over multiple symbols or subframes/slots). In another example, the A-CSI request includes at least three hypotheses (or interpretations) wherein the three of the hypotheses are to report one instance of A-CSI, activate A-CSI, and deactivate A-CSI. The CSI-RS and the A-CSI can also be triggered jointly or separately.

Subsequently, the UE measures the triggered CSI-RS for the purpose of CSI calculation (step 1402). The CSI-RS includes two signal components for channel and interference measurement, respectively. The requested A-CSI is then calculated and reported by the UE (step 1403).

Figure 15:
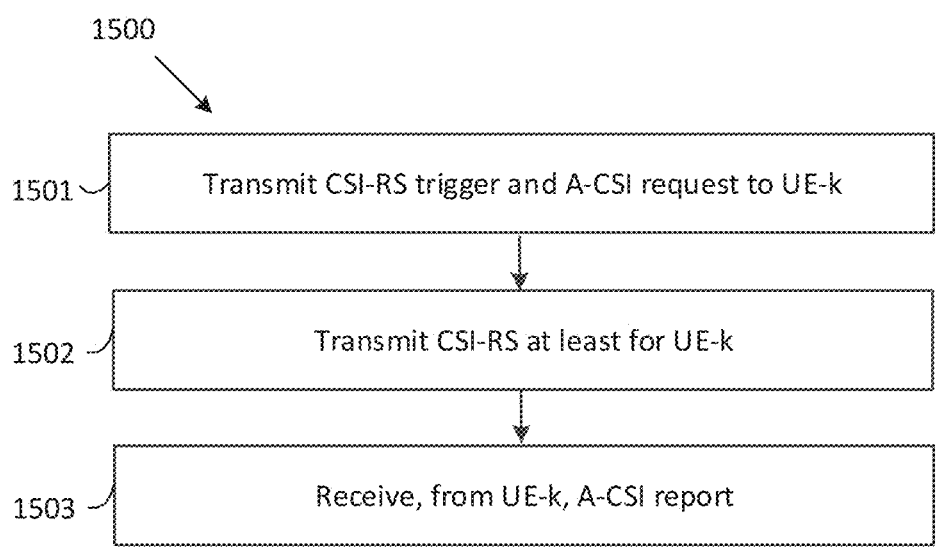
FIG. 15 illustrates a flowchart for an example method wherein a BS transmits CSI-RS trigger and aperiodic CSI request for a UE (labeled as UE-k) according to an embodiment of the present disclosure.

FIG. 15 illustrates a flowchart for an example method 1500 wherein a BS generates beam monitoring information for a UE (labeled as UE-k) according to an embodiment of the present disclosure. For example, the method 1500 can be performed by the BS 102.

The method 1500 begins with the BS transmitting CSI-RS trigger and A-CSI request for a UE, labelled UE-k (step 1501). In one example, the CSI-RS trigger includes at least three hypotheses (or interpretations) wherein the three hypotheses are to measure one instance of CSI-RS, activate CSI-RS, and deactivate CSI-RS. Optionally, the hypotheses correspond to different numbers of CSI-RS instances (which can be distributed over multiple symbols or subframes/slots). In another example, the A-CSI request includes at least three hypotheses (or interpretations) wherein the three of the hypotheses are to report one instance of A-CSI, activate A-CSI, and deactivate A-CSI. The CSI-RS and the A-CSI can also be triggered jointly or separately.

Subsequently, the BS transmits the triggered CSI-RS for the purpose of aiding the UE for CSI calculation (step 1502). The CSI-RS includes two signal components for channel and interference measurement, respectively. The requested A-CSI report is then received from the UE (step 1503).

Although FIGS. 14 and 15 illustrate examples of methods for receiving configuration information and configuring a UE, respectively, various changes can be made to FIGS. 14 and 15. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive, from a base station, a channel state information-reference signal (CSI-RS) trigger and an aperiodic CSI (A-CSI) request; and
a processor operably connected to the transceiver, the processor configured to:
decode the CSI-RS trigger and the A-CSI request;
measure a CSI-RS associated with the CSI-RS trigger; and
calculate, based on the measured CSI-RS, an A-CSI report associated with the A-CSI request,
wherein the transceiver is further configured to transmit, to the base station, the A-CSI report,
wherein the CSI-RS includes two signal components for channel and interference measurement, respectively, and
wherein the CSI-RS trigger includes at least three hypotheses.

2. The UE of claim 1, wherein the CSI-RS measurement and the A-CSI report are triggered jointly.

3. The UE of claim 1, wherein the three hypotheses are to measure one instance of the CSI-RS, to activate the CSI-RS, and to deactivate the CSI-RS.

4. The UE of claim 1, wherein:
the hypotheses correspond to different CSI-RS instances, and
the processor is configured to:
measure at least a first of the CSI-RS instances,
activate at least a second of the CSI-RS instances, and
deactivate at least a third of the CSI-RS instances.

5. The UE of claim 1, wherein the A-CSI request includes at least three hypotheses.

6. The UE of claim 5, wherein the three hypotheses for the A-CSI request are to report one instance of an A-CSI, to activate the A-CSI, and to deactivate the A-CSI.

7. A base station (BS) comprising:
a processor configured to generate a channel state information-reference signal (CSI-RS) trigger and an aperiodic CSI (A-CSI) request; and
a transceiver operably connected to the processor, the transceiver configured to:
transmit, to a user equipment (UE), the CSI-RS trigger and the A-CSI request; and
receive, from the UE, an A-CSI report associated with the A-CSI request calculated based on measurement of a CSI-RS associated with the CSI-RS trigger,
wherein the CSI-RS includes two signal components for channel and interference measurement, respectively, and
wherein the CSI-RS trigger includes at least three hypotheses.

8. The BS of claim 7, wherein:
the A-CSI request includes at least three hypotheses, and
the three of the hypotheses for the A-CSI request are to report one instance of an A-CSI, to activate the A-CSI, and to deactivate the A-CSI.

9. The BS of claim 8, wherein the CSI-RS measurement and the A-CSI report are triggered jointly.

10. The BS of claim 7, wherein the three of the hypotheses are to measure one instance of the CSI-RS, to activate the CSI-RS, and to deactivate the CSI-RS.

11. The BS of claim 7, wherein the hypotheses correspond to different CSI-RS instances for measurement of at least a first of the CSI-RS instances, activation of at least a second of the CSI-RS instances, and deactivation of at least a third of the CSI-RS instances.

12. A method for operating a user equipment (UE), the method comprising:
receiving, from a base station, a channel state information-reference signal (CSI-RS) trigger and an aperiodic CSI (A-CSI) request;
decoding the CSI-RS trigger and the A-CSI request;
measuring a CSI-RS associated with the CSI-RS trigger;
calculating, based on the measured CSI-RS, an A-CSI report associated with the A-CSI request; and
transmitting, to the base station, the A-CSI report,
wherein the CSI-RS includes two signal components for channel and interference measurement, respectively, and
wherein the CSI-RS trigger includes at least three hypotheses.

13. The method of claim 12, wherein the A-CSI request includes at least three hypotheses.

14. The method of claim 13, wherein the three of the hypotheses for the A-CSI request are to report one instance of A-CSI, to activate the A-CSI, and to deactivate the A-CSI.

15. The method of claim 14, wherein the CSI-RS measurement and the A-CSI report are triggered jointly.

16. The method of claim 12, wherein the three of the hypotheses are to measure one instance of the CSI-RS, to activate the CSI-RS, and to deactivate the CSI-RS.

17. The method of claim 12, wherein the hypotheses correspond to different CSI-RS instances, and the method further comprises:
   measuring at least a first of the CSI-RS instances;
   activating at least a second of the CSI-RS instances; and
   deactivating at least a third of the CSI-RS instances.

\* \* \* \* \*